(12) United States Patent
Kubota

(10) Patent No.: US 7,855,841 B2
(45) Date of Patent: Dec. 21, 2010

(54) REFLEX, MAGNIFYING OPTICAL SYSTEM

(75) Inventor: Takashi Kubota, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 0 days.

(21) Appl. No.: 12/397,586

(22) Filed: Mar. 4, 2009

(65) Prior Publication Data

US 2009/0225438 A1    Sep. 10, 2009

(30) Foreign Application Priority Data

Mar. 10, 2008    (JP)    ............... 2008-060149

(51) Int. Cl.
    *G02B 15/14*    (2006.01)
(52) U.S. Cl. .................. 359/686; 359/676
(58) Field of Classification Search .......... 359/676, 359/683, 686
    See application file for complete search history.

(56) References Cited

U.S. PATENT DOCUMENTS

| | | | |
|---|---|---|---|
| 7,164,543 B2 * | 1/2007 | Arai | 359/689 |
| 7,215,484 B2 * | 5/2007 | Yamashita et al. | 359/682 |
| 7,443,599 B2 * | 10/2008 | Kohno et al. | 359/682 |
| 7,684,122 B2 * | 3/2010 | Shirota | 359/676 |
| 2004/0223234 A1 | 11/2004 | Konno | |
| 2004/0246362 A1 | 12/2004 | Konno | |
| 2007/0201143 A1 | 8/2007 | Kohno et al. | |

FOREIGN PATENT DOCUMENTS

| | | |
|---|---|---|
| CN | 1837942 A | 9/2006 |
| JP | 2004-163477 A | 6/2004 |
| JP | 2004-333721 A | 11/2004 |
| JP | 2004-334070 A | 11/2004 |
| JP | 2005-128065 A | 5/2005 |
| JP | 2007-232974 A | 9/2007 |

* cited by examiner

*Primary Examiner*—Jack Dinh
(74) *Attorney, Agent, or Firm*—Foley & Lardner LLP

(57) ABSTRACT

A first lens group in a reflex, magnifying optical system includes sequentially from the side of an object, a first lens that has a negative refractive power and is a meniscus lens having a concave aspect facing toward an image, an optical element (prism) that refracts an optical path, a second lens having a negative refractive power and a concave aspect facing toward the object, and a third lens having a positive refractive power. A portion of an image-side aspect of the first lens abuts a plane of incidence of the optical element. A portion of an object-side aspect of the second lens abuts a plane of transmission of the optical element.

4 Claims, 21 Drawing Sheets

FIG.6 CHROMATIC ABERRATION OF MAGNIFICATION (WIDE-ANGLE EDGE)

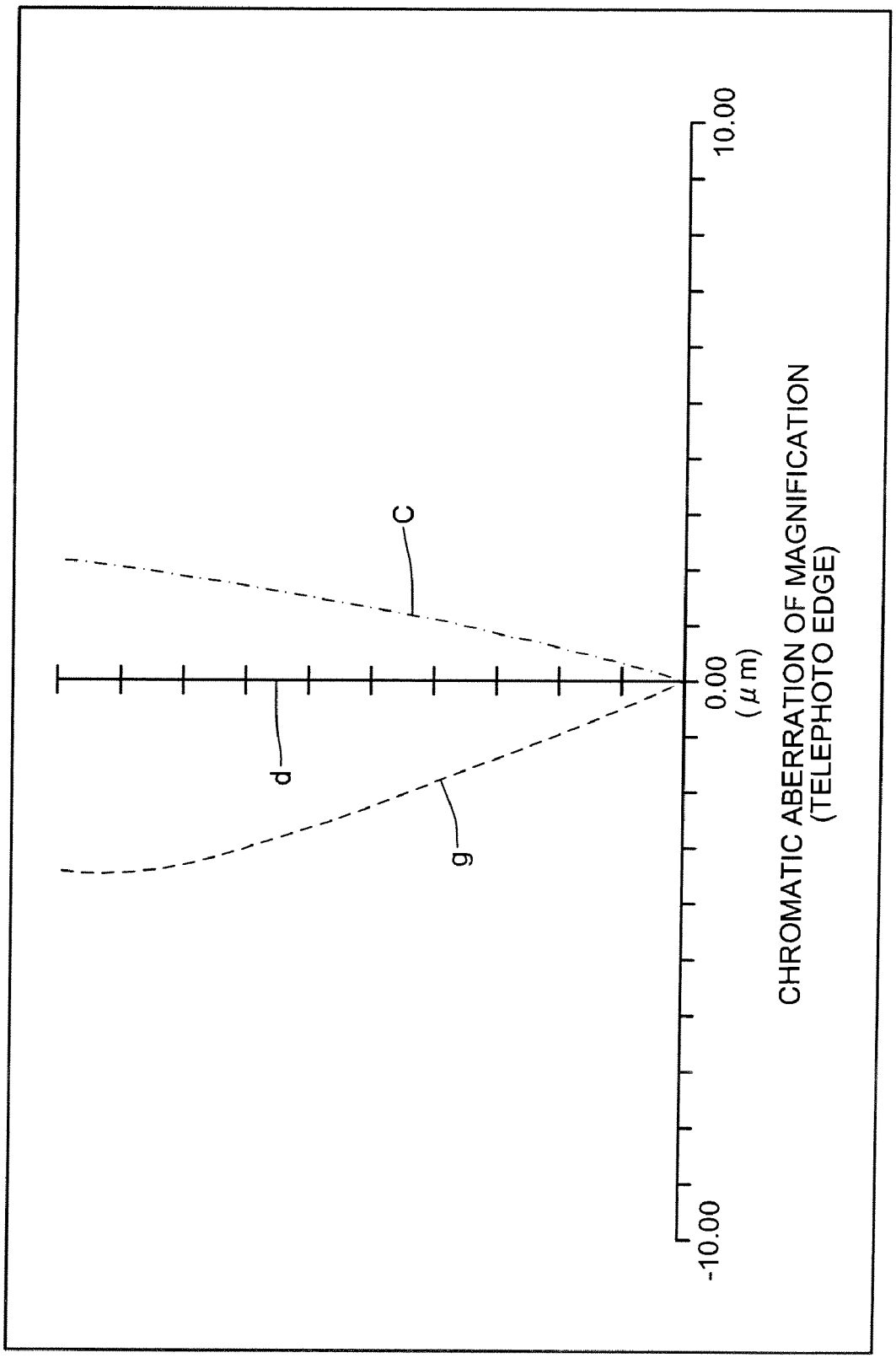

REFLEX, MAGNIFYING OPTICAL SYSTEM

BACKGROUND OF THE INVENTION

1. Field of the Invention

The present invention relates to a reflex, magnifying optical system.

2. Description of the Related Art

Recently, accompanying demand for smaller sized imaging devices, there is demand for smaller sized lenses mounted on the imaging devices as well. In response, reflex optical systems employing a prism in an optical path to refract the optical path have been proposed, such as those disclosed in Japanese Patent Application Laid-Open Publication Nos. 2005-128065, 2004-334070, 2004-333721, 2007-232974, and 2004-163477.

Reflex optical systems disclosed in the publications achieve a reduced depth (thickness) by refracting the light path. Consequently, mounting of these reflex optical systems has enabled imaging devices to have shortened depths as well.

The lens arranged on the incident side or on the emission side of the prism that refracts the optical path tends to have high error sensitivity (e.g., tilt error). High error sensitivity is undesirable and leads to significant deterioration of optical performance. Each of the reflex optical systems disclosed in the publications place great emphasis on achieving reductions in the size of the optical system and in doing so, a problem arises in that the means for reducing the error sensitivity is insufficient.

SUMMARY OF THE INVENTION

It is an object of the present invention to at least solve the above problems in the conventional technologies.

A reflex, magnifying optical system according to one aspect of the present invention is a variable-magnification optical system that has multiple lens groups and varies magnification by moving any of the lens groups. The reflex, magnifying optical system includes an optical element that refracts an optical path and is provided in a first lens group arranged closest to an object. Further, a first lens having curvature is disposed so as to abut a plane of incidence of the optical element and a second lens having curvature is disposed so as to abut a plane of transmission of the optical element.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 22 is a diagram of chromatic aberration of magnification at the telephoto edge of the reflex, magnifying optical system according to the second embodiment.

DETAILED DESCRIPTION OF THE PREFERRED EMBODIMENTS

Referring to the accompanying drawings, exemplary embodiments according to the present invention are explained in detail below.

A reflex, magnifying optical system according to embodiments of the present invention includes sequentially from an object side, a first lens group having a negative refractive power, a second lens group having a positive refractive power, a third lens group having a negative refractive power, and a fourth lens group having a positive refractive power. The reflex, magnifying optical system varies magnification by moving the second lens group and the third lens group along an optical axis.

Figure 1:
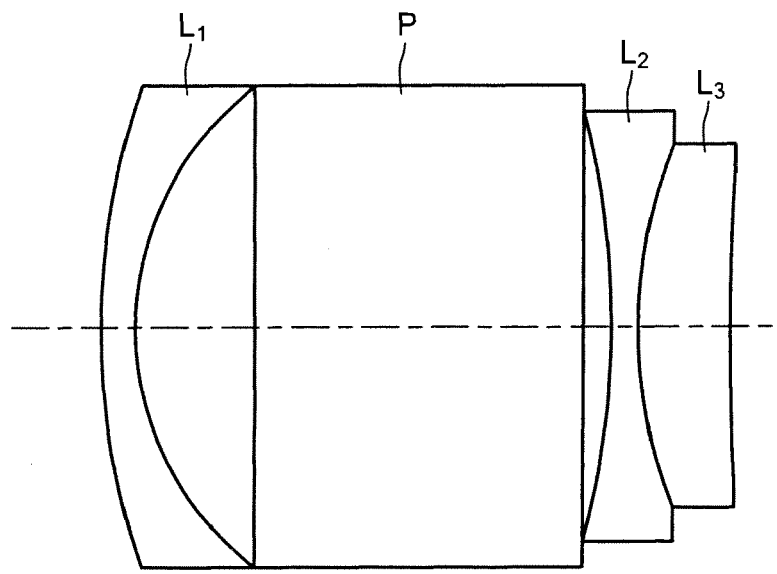
FIG. 1 is a cross sectional view of a first lens group in a reflex, magnifying optical system.

FIG. 1 is a cross sectional view, along the optical axis, of the first lens group in the reflex, magnifying optical system. As depicted in FIG. 1, the first lens group includes sequentially from the object side (object not depicted), a first lens $L_1$ that has a negative refractive power and is a meniscus lens with a concave aspect facing toward an image, an optical element (prism) P that refracts an optical path, a second lens $L_2$ that has a negative refractive power and a concave aspect facing toward the object, and a third lens $L_3$ that has a positive refractive power. A portion of an aspect on the image-side of the first lens $L_1$ abuts a plane of incidence of the optical element P. A portion of an aspect on the object-side of the second lens $L_2$ abuts a plane of transmission of the optical element P.

Thus, by a configuration in which the first lens $L_1$ and the second lens $L_2$ respectively abut the plane of incidence and the plane of transmission of the optical element P, reduction in the size the optical system, in terms of depth, can be enhanced. By causing the first lens $L_1$ and the second lens $L_2$ to abut the optical element P, optical dislocation (tilt) of the first lens $L_1$ and the second lens $L_2$ can be suppressed and deterioration of optical performance can be prevented.

An object of the present invention is to provide a compact, reflex, magnifying optical system in which the deterioration and variation of optical performance is prevented by reducing error sensitivity. Particularly, with respect to the first lens $L_1$ and the second lend $L_2$, which are apt to cause error sensitivity, the following conditions are set in the present invention to reduce such error sensitivity.

When an image-side radius of curvature of the lens (first lens $L_1$) abutting the plane of incidence of the light of the optical element P is $R_2$, a value of an image-side effective aperture of the lens (first lens $L_1$) abutting the plane of incidence of the light of the optical element P+1.0 mm is $yR_2$, a center distance between the optical element P and the lens (first lens $L_1$) abutting the plane of incidence of the light of the optical element P is $\Delta H_2$, an object-side radius of curvature of the lens (second lens $L_2$) abutting the plane of transmission of the light of the optical element P is $R_5$, a value of an object-side effective aperture of the lens (second lens $L_2$) abutting the plane of transmission of the light of the optical element P+1.0 mm is $yR_5$ a center distance between the optical element P and the lens (second lens $L_2$) abutting the plane of transmission of the light of the optical element P is $\Delta H_5$, it is preferable that the following conditional expressions are satisfied:

$$yR2 > \Delta H_2 \quad (1)$$

$$yR_5 > \Delta H5 \quad (2)$$

where $R_2 > 0$ and $R_5 < 0$.

By satisfying the conditional expressions (1) and (2), positional accuracy can be improved between the optical element P and the lenses (first lens $L_1$ and second lens $L_2$) respectively abutting the plane of incidence and the plane of transmission of the optical element P and deterioration of the optical performance can be curbed more effectively.

Figure 2:
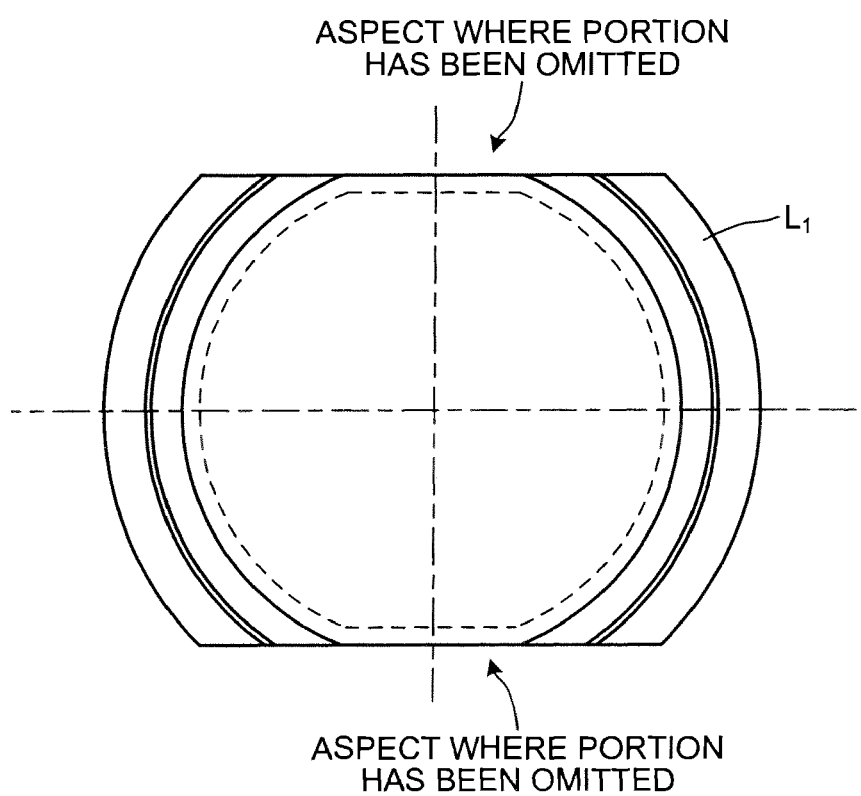
FIG. 2 depicts the shape of a first lens of the first lens group.

The first lens $L_1$ of the reflex, magnifying optical system according to the present embodiments has an unconventional shape. FIG. 2 depicts the shape of the first lens of the first lens group as viewed from the object side.

As depicted in FIG. 2, the first lens $L_1$ is shaped so that a portion of the perimeter is omitted. Thus, by omitting an outer portion of the first lens $L_1$, a reduction in the size of the first lens $L_1$ in a vertical direction (a direction perpendicular to the optical axis) can be achieved. The omitted portion is a portion through which light related to focusing does not pass and is, so to speak, an unnecessary portion. Therefore, by omitting the unnecessary portion, the problem of ghost and flare caused by light unrelated to focusing entering the optical system can be prevented.

In the reflex, magnifying optical system according to the present invention, it is preferable that at least one set of cemented lenses configured by cementing two lenses together is arranged on the side of the plane of transmission of the optical element P. By cementing two lenses together, the occurrence of chromatic aberration can be suppressed. By the cementing of two lenses together, as compared with an arrangement of individual lenses, the occurrence of manufacturing error can be suppressed and optical performance can be maintained.

The cemented lenses arranged on the side of the plane of transmission of the optical element P may be three lenses cemented together, instead of two lenses. By cementing three lenses together, the occurrence of various aberrations can be suppressed more efficiently. By the cementing of three lenses together, as compared with an arrangement of individual lenses, centering may be omitted in the manufacturing process and therefore, simplification of the manufacturing process can be facilitated. In addition, manufacturing errors can be prevented and high optical performance can be maintained.

In the reflex, magnifying optical system according to the present embodiments, the second lens group may include an optical diaphragm and three lenses. By providing the optical diaphragm in the second lens group, the aperture of the optical system can be made smaller and reduction of the size of the optical system can be enhanced. By providing three lenses in the second lens group, well-balanced correction can be made for spherical aberration, astigmatism, and coma that are caused by a change in the angle of view at the time of varying the magnification.

In the reflex, magnifying optical system according to the present embodiments, it is preferable that the third lens group includes a negative lens having two concave aspects. By such a configuration, the outer diameter of the lens may be made smaller. In addition, it is preferable that the negative lens making up the third lens group is formed of resin. By forming the lens of the resin, lens processing is facilitated and therefore, manufacturing cost can be reduced. Further, a lighter weight of the lens can also be achieved.

In the reflex, magnifying optical system according to the present embodiments, it is preferable that the fourth lens group includes a positive lens that has a convex aspect facing toward the image and whose refractive power becomes progressively weaker towards the perimeter of the lens. Since the fourth lens group functions as a field lens as well, such configuration is more effective. In addition, it is preferable that the positive lens making up the fourth lens is formed of resin. By forming the lens of resin, lens processing is facilitated and therefore, manufacturing cost can be reduced. Further, a lighter weight of the lens can also be achieved.

In the reflex, magnifying optical system according to the present embodiments, it is preferable that the first lens group and the fourth lens group are fixed at all times. By such a configuration, dust can be prevented from entering the inside of the optical system and optical performance can be prevented from deteriorating.

As described above, the reflex, magnifying optical system according to the present embodiments becomes a compact, reflex, magnifying optical system designed to reduce error sensitivity and prevent deterioration of optical performance. In particular, the reflex, magnifying optical system, by being configured appropriately using lenses with an aspheric surface formed thereon, can effectively correct various aberrations with a small number of lenses and is capable of achieving reductions in the size and the weight of the optical system as well as in the manufacturing cost.

Figure 3:
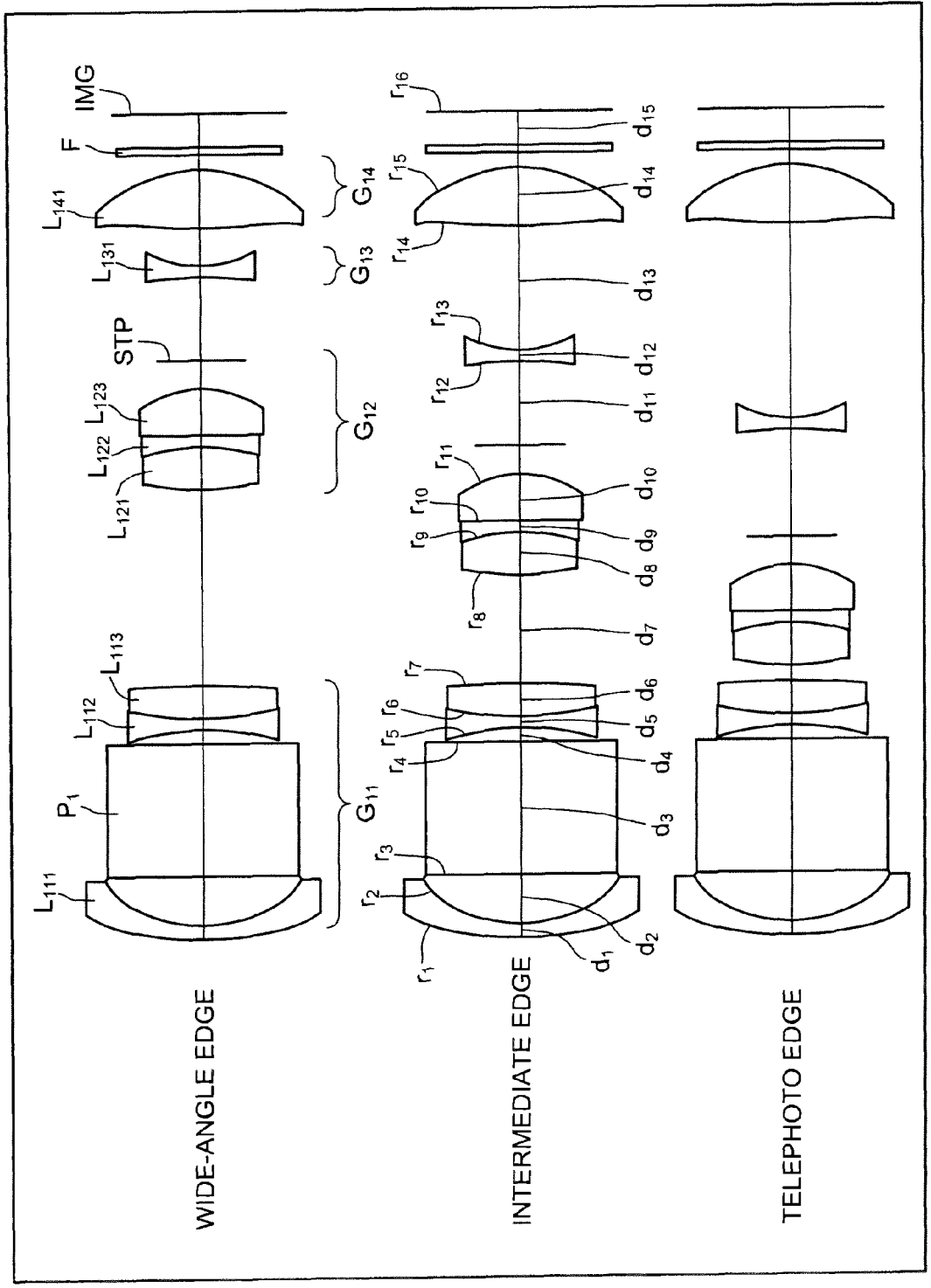
FIG. 3 is a cross sectional view of a reflex, magnifying optical system according to a first embodiment.

FIG. 3 is a cross sectional view, along the optical axis, of a reflex, magnifying optical system according to a first embodiment. The reflex, magnifying optical system includes sequentially from the object side (object not depicted), a first lens group $G_{11}$ having a negative refractive power, a second lens group $G_{12}$ having a positive refractive power, a third lens group $G_{13}$ having a negative refractive power, and a fourth lens group $G_{14}$ having a positive refractive power. The reflex, magnifying optical system varies magnification by moving the second lens group $G_{12}$ and the third lens group $G_{13}$ along the optical axis. The first lens group $G_{11}$ and the fourth lens group $G_{14}$ are fixed at all times. A filter F including an IR (infrared) cut filter, a low-pass filter, a cover glass, etc. is arranged between the fourth lens group $G_{14}$ and an image plane IMG. The filter F is provided as necessary and may be omitted if not necessary. A light receiving surface of an imaging device such as a charge-coupled device (CCD) and a complementary metal oxide semiconductor (CMOS) is provided at the image plane IMG.

The first lens group $G_{11}$ includes a first lens $L_{111}$ that has a negative refractive power and is a meniscus lens having a concave aspect facing toward the image, a prism $P_1$ that refracts the optical path, a second lens $L_{112}$ having a negative refractive power and a concave aspect facing toward the object, and a third lens $L_{113}$ having a positive refractive power. A portion of an aspect on the image plane IMG-side of the first lens $L_{111}$ abuts the plane of incidence of the prism $P_1$. An aspheric surface is formed on both faces of the first lens $L_{111}$. The first lens $L_{111}$ is shaped so that a portion of the perimeter is omitted (see FIG. 2). A portion of the object-side aspect of the second lens $L_{112}$ abuts the plane of transmission of the prism $P_1$. The second lens $L_{112}$ and the third lens $L_{113}$ abut each other.

The second lens group $G_{12}$ includes sequentially from the object side, a first lens $L_{121}$ having a positive refractive power, a second lens $L_{122}$ having a negative refractive power, a third lens $L_{123}$ having a positive refractive power, and an optical diaphragm STP. The first lens $L_{121}$, the second lens $L_{122}$, and the third lens $L_{123}$ are cemented together. An aspheric surface is formed on the object-side aspect of the first lens $L_{121}$ and the image plane IMG-side aspect of the third lens $L_{123}$.

The third lens group $G_{13}$ includes a negative lens $L_{131}$ having two concave aspects. An aspheric surface is formed on both aspects of the negative lens $L_{131}$. It is preferable that the negative lens $L_{131}$ is formed of resin.

The fourth lens group $G_{14}$ includes a positive lens $L_{141}$ that has a convex aspect facing toward the image and whose refractive power becomes weaker progressively toward the perimeter of the lens. An aspheric surface is formed on both faces of the positive lens $L_{141}$. It is preferable that the positive lens $L_{141}$ is formed of resin.

Figure 4:
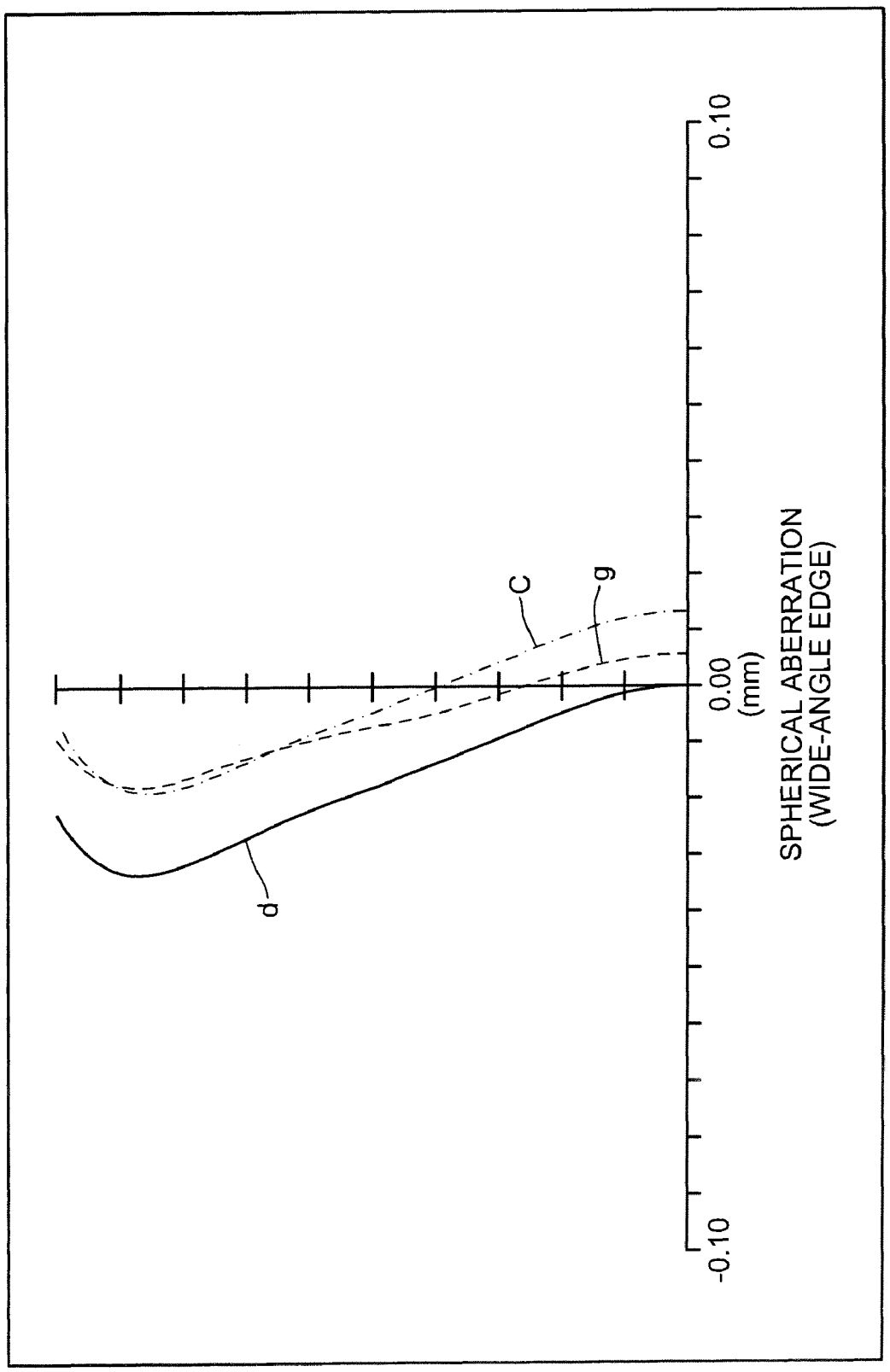
FIG. 4 is a diagram of spherical aberration at the wide-angle edge of the reflex, magnifying optical system according to the first embodiment.
Figure 5:
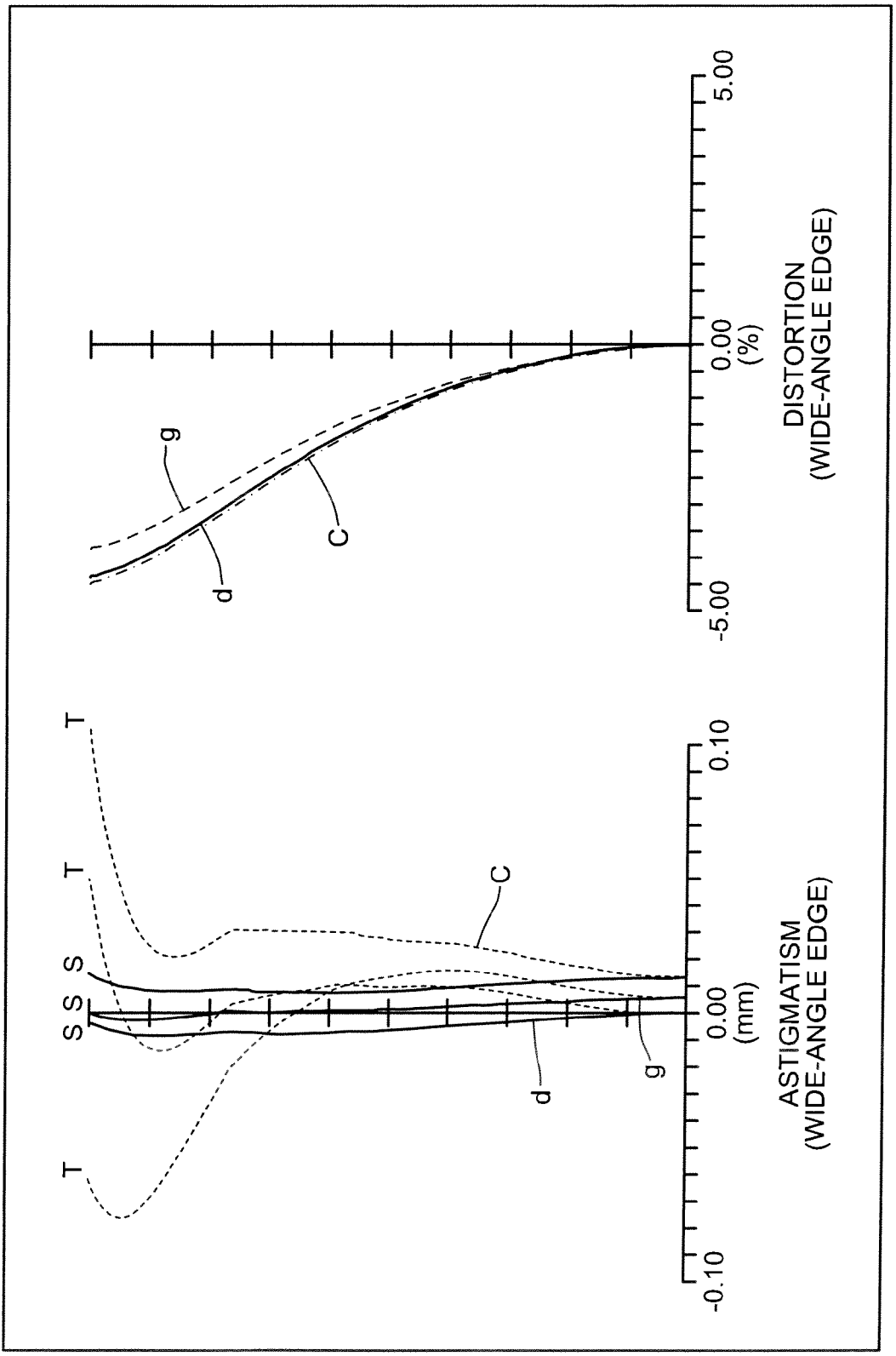
FIG. 5 depicts diagrams of astigmatism and distortion at the wide-angle edge of the reflex, magnifying optical system according to the first embodiment.
Figure 6:
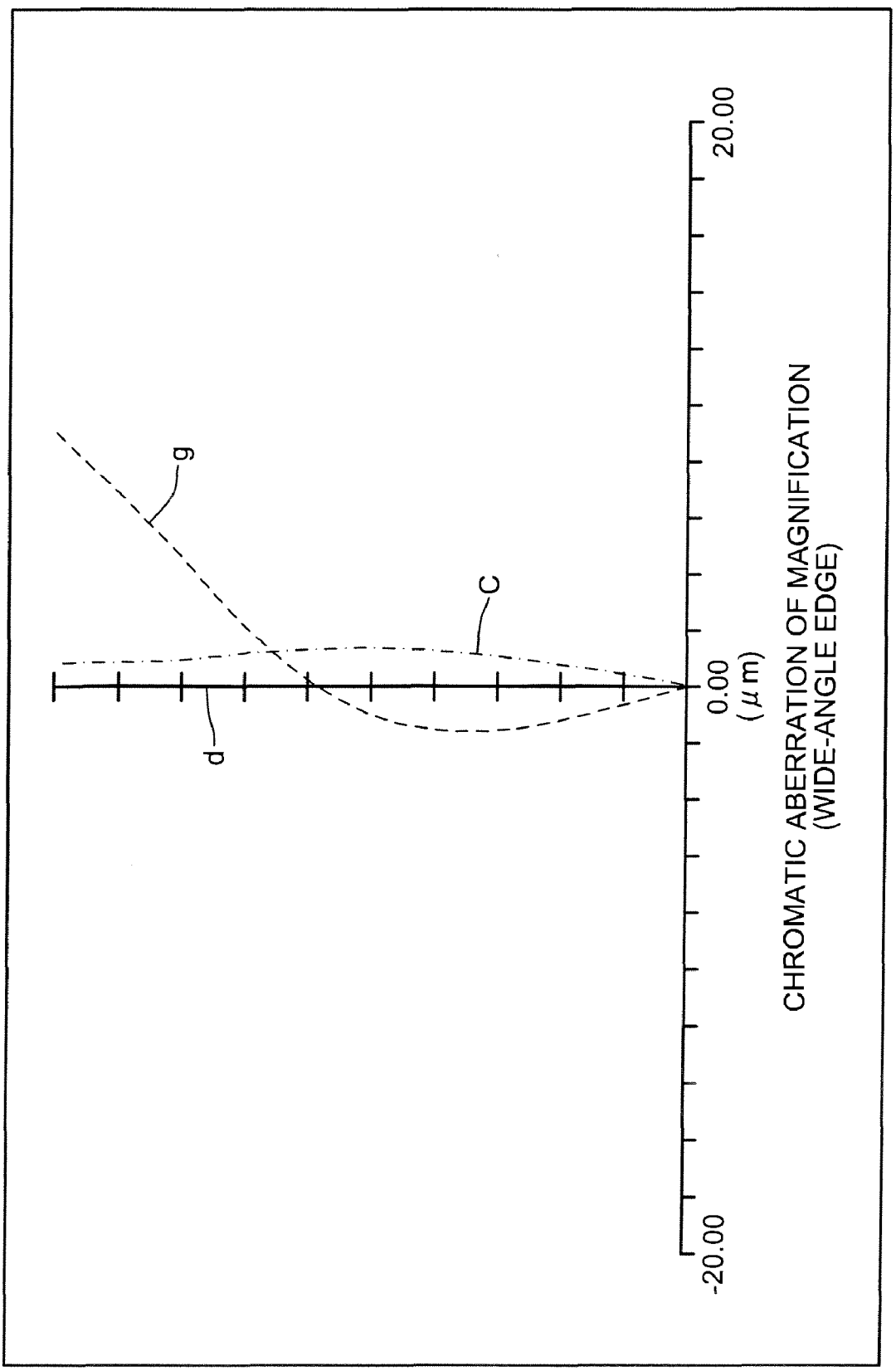
FIG. 6 is a diagram of chromatic aberration of magnification at the wide-angle edge of the reflex, magnifying optical system according to the first embodiment.
Figure 7:
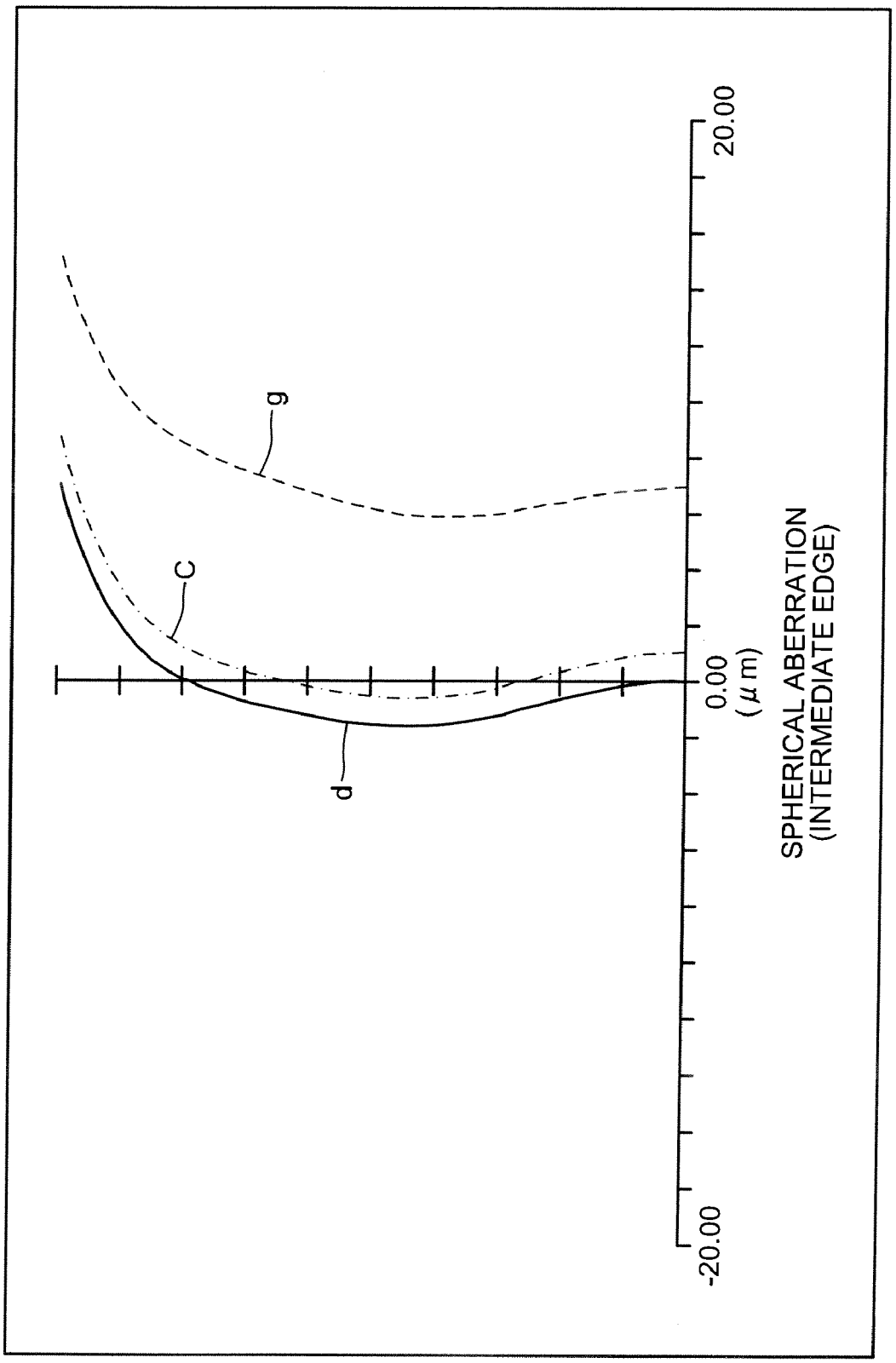
FIG. 7 is a diagram of spherical aberration at the intermediate edge of the reflex, magnifying optical system according to the first embodiment.
Figure 8:
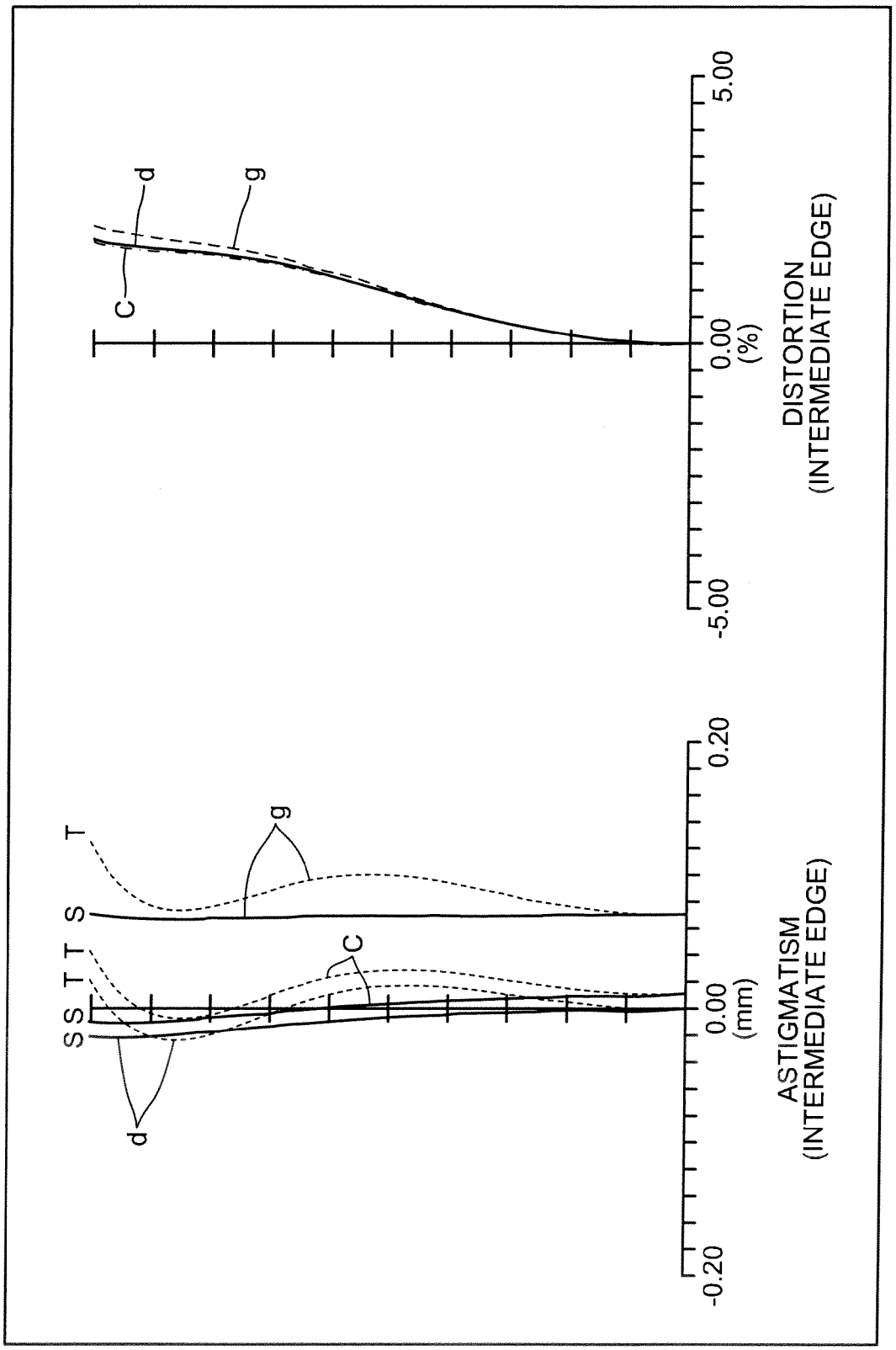
FIG. 8 depicts diagrams of astigmatism and distortion at the intermediate edge of the reflex, magnifying optical system according to the first embodiment.
Figure 9:
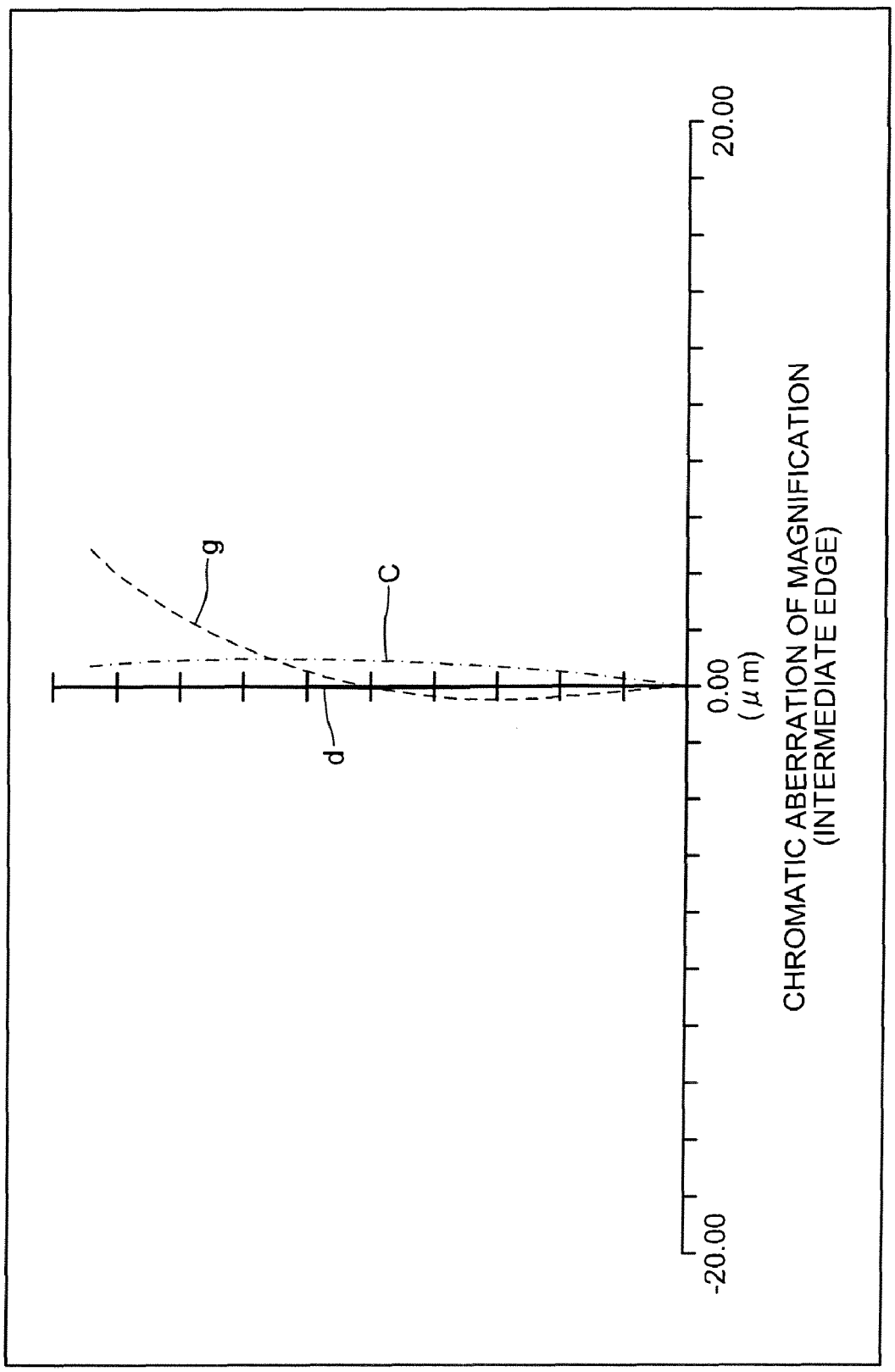
FIG. 9 is a diagram of chromatic aberration of magnification at the intermediate edge of the reflex, magnifying optical system according to the first embodiment.
Figure 10:
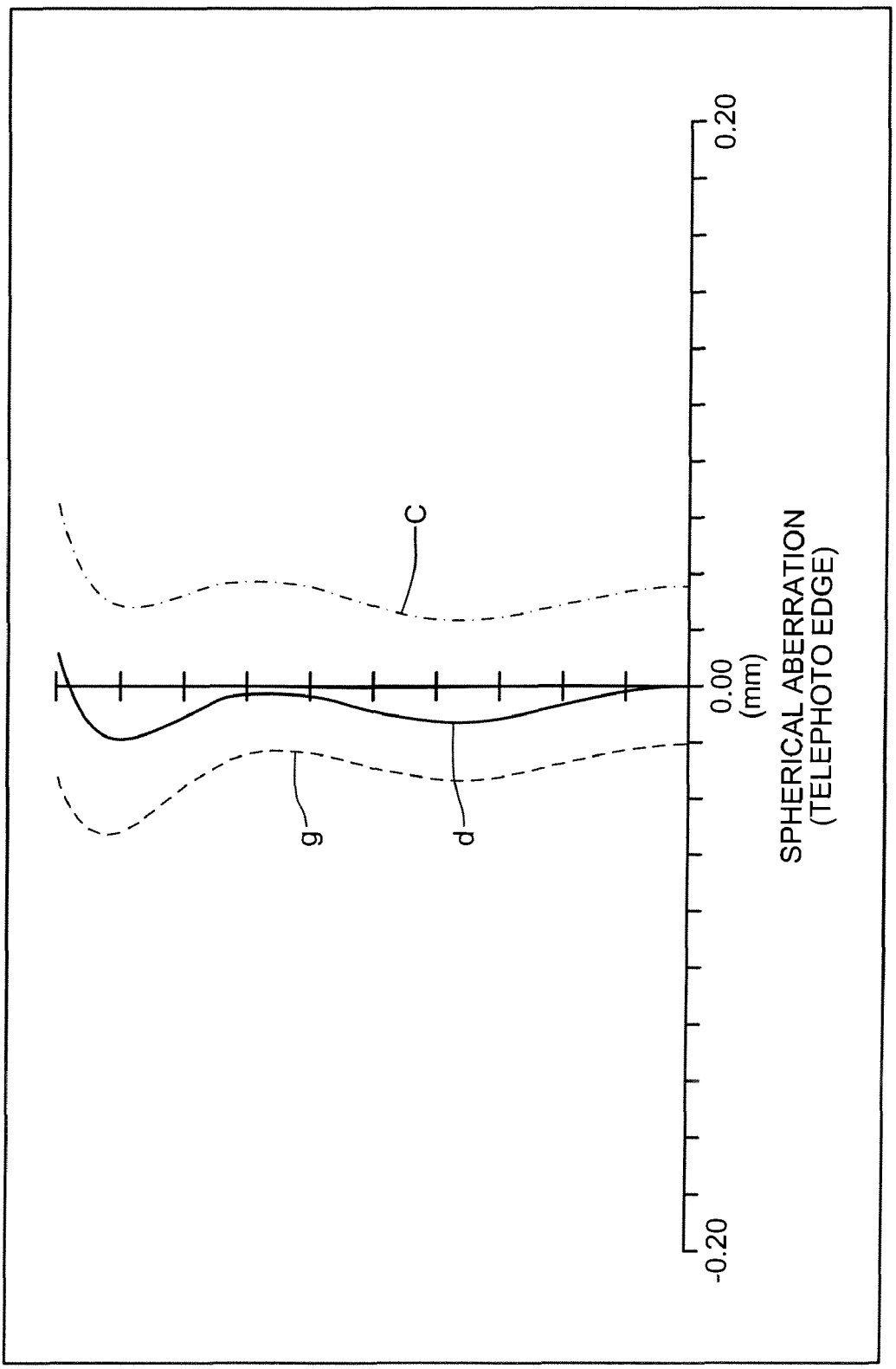
FIG. 10 is a diagram of spherical aberration at the telephoto edge of the reflex, magnifying optical system according to the first embodiment.
Figure 11:
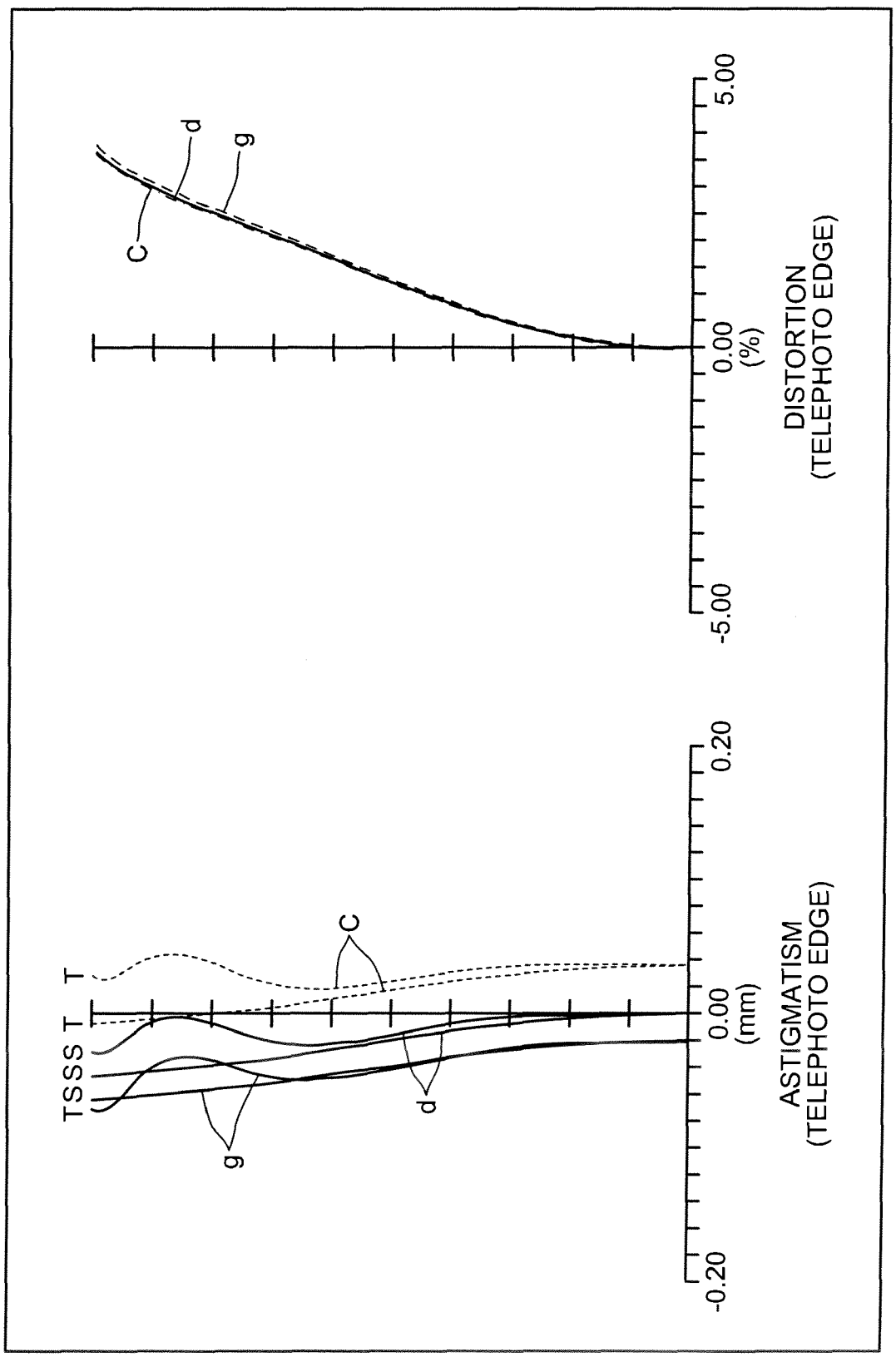
FIG. 11 depicts diagrams of astigmatism and distortion at the telephoto edge of the reflex, magnifying optical system according to the first embodiment.
Figure 12:
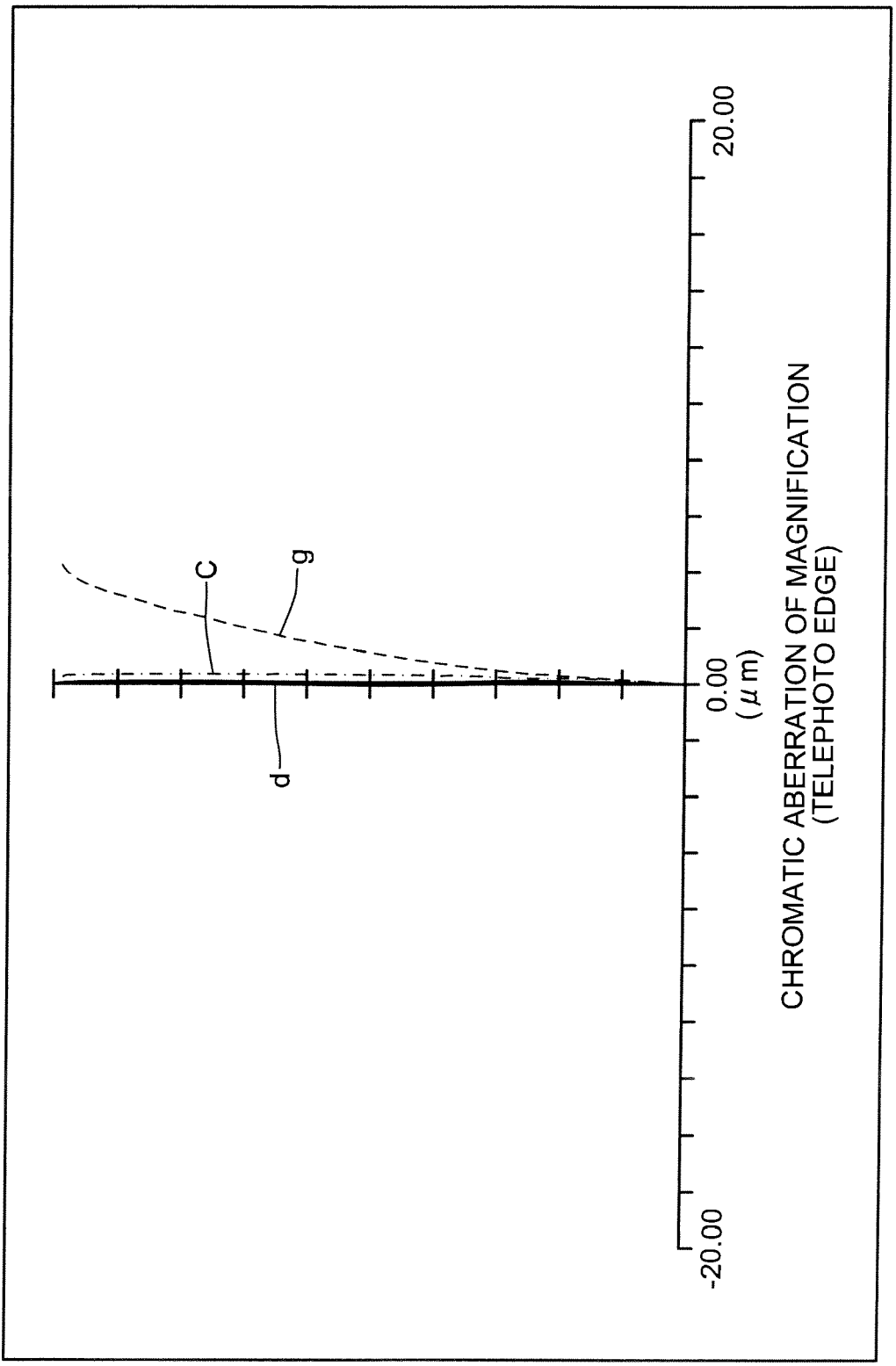
FIG. 12 is a diagram of chromatic aberration of magnification at the telephoto edge of the reflex, magnifying optical system according to the first embodiment.

Various numerical data of the reflex, magnifying optical system according to the first embodiment is given.
Total length=29.83
Focal length=4.23 (wide-angle edge) to 7.041 (intermediate edge) to 11.72 (telephoto edge)
F-number=3.0 (wide-angle edge) to 5.68 (telephoto edge)
Angle of view (2ω)=70.8° (wide-angle edge) to 44.4° (intermediate edge) to 28.80 (telephoto edge)
Focal length of first lens group $G_{11}$=−7.33
Focal length of first lens $L_{111}$ in first lens group $G_{11}$=−10.21
Focal length of second lens $L_{112}$ in first lens group $G_{11}$=−7.37
Focal length of third lens $L_{113}$ in first lens group $G_{11}$=9.65
Focal length of second lens group $G_{12}$=5.68
Focal length of first lens $L_{121}$ in second lens group $G_{12}$=5.66
Focal length of second lens $L_{122}$ in second lens group $G_{12}$=−7.18
Focal length of third lens $L_{123}$ in second lens group $G_{12}$=6.68
Focal length of third lens group $G_{13}$=−4.87
Focal length of fourth lens group $G_{14}$=7.50
Image height=3
Magnification=2.73
(Numerical Values Related to Conditional Expression (1))
Image-side radius of curvature ($R_2$) of first lens $L_{111}$ abutting incident plane of prism $P_1$=5.577797
Value ($yR_2$) of image-side effective aperture of first lens $L_{111}$ abutting incident plane of prism $P_1$+1.0 mm=4.62
Center distance ($\Delta H_2$) between prism $P_1$ and first lens $L_{111}$ abutting light incident plane of prism $P_1$=1.75
(Numerical Values Related to Conditional Expression (2))
Image-side radius of curvature ($R_5$) of second lens $L_{112}$ abutting transmission plane of prism $P_1$=−9.24
Value ($yR_5$) of image-side effective aperture of second lens $L_{112}$ abutting transmission plane of prism $P_1$+1.0 mm=3.74
Center distance ($\Delta H_5$) between prism $P_1$ and second lens $L_{112}$ abutting transmission plane of prism $P_1$=0.51
$r_1$=14.043806 (aspheric surface)
$d_1$=0.5 $nd_1$=1.9229 $vd_1$=20.88
$r_2$=5.577797 (aspheric surface)
$d_2$=1.75
$r_3$=∞ (prism plane)
$d_3$=1.48 $nd_2$=1.8467 $vd_2$=23.78
$r_4$=∞ (prism plane)
$d_4$=0.50702
$r_5$=−9.247252
$d_5$=0.4 $nd_3$=1.6935 $vd_3$=53.34
$r_6$=11.754146
$d_6$=1.183268 $nd_4$=1.9229 $vd_4$=20.88
$r_7$=−36.665276
$d_7$=7.106451 (wide-angle edge) to 3.9135 (intermediate edge) to 0.5031 (telephoto edge)
$r_8$=6.062086 (aspheric surface)
$d_8$=1.615897 $nd_5$=1.5831 $vd_5$=59.46
$r_9$=−6.581992
$d_9$=0.4 $nd_6$=1.9036 $vd_6$=31.30
$r_{10}$=1084.183991
$d_{10}$=1.699976 $nd_7$=1.5225 $vd_7$=62.30
$r_{11}$=−3.513409 (aspheric surface)
$d_{11}$=−4.00951 (wide-angle edge) to 4.0547 (intermediate edge) to 4.875 (telephoto edge)
$r_{12}$=18.81701 (aspheric surface)
$d_{12}$=0.4 $nd_8$=1.6142 $vd_8$=25.57
$r_{13}$=2.578228 (aspheric surface)
$d_{13}$=1.366645 (wide-angle edge) to 4.5144 (intermediate edge) to 7.1045 (telephoto edge)
$r_{14}$=22.927718 (aspheric surface)
$d_{14}$=2.1 $nd_9$=1.5094 $vd_9$=55.87
$r_{15}$=−4.464141 (aspheric surface)
$d_{15}$=1.888
$r_{16}$=∞ (image plane)
Conic factor ($\epsilon$) and aspheric factor (A, B, C, D)
(First Plane)
$\epsilon$=4.627,
A=1.26×10$^{-4}$, B=−2.38×10$^{-5}$,
C=3.53×10$^{-6}$, D=−6.81×10$^{-8}$
(Second Plane)
$\epsilon$=1.963,
A=−3.08×10$^{-4}$, B=−6.04×10$^{-5}$,
C=3.93×10$^{-6}$, D=9.49×10$^{-8}$
(Eighth Plane)
$\epsilon$=0.359, $A=-2.82\times10^{-3}, B=-2.59\times10^{-4},$
$C=1.82\times10^{-6}, D=-7.92\times10^{-6}$
(Eleventh Plane)
$\epsilon=0.988,$
$A=2.45\times10^{-3}, B=-7.22\times10^{-5},$
$C=-1.55\times10^{-5}, D=1.19\times10^{-6}$
(Twelfth Plane)
$\epsilon=46.737,$
$A=-2.58\times10^{-2}, B=1.25\times10^{-3},$
$C=4.19\times10^{-4}, D=-6.91\times10^{-5}$
(Thirteenth Plane)
$\epsilon=0.898,$
$A=-3.22\times10^{-2}, B=1.86\times10^{-3},$
$C=2.82\times10^{-4}, D=-6.67\times10^{-5}$
(Fourteenth Plane)
$\epsilon=1.000,$
$A=-3.39\times10^{-4}, B=1.85\times10^{-4},$
$C=-2.59\times10^{-5}, D=5.14\times10^{-7}$
(Fifteenth Plane)
$\epsilon=0.814,$
$A=3.40\times10^{-3}, B=5.16\times10^{-5},$
$C=-1.66\times10^{-5}, D=3.48\times10^{-5},$ FIG. 4 is a diagram of spherical aberration at the wide-angle edge of the reflex, magnifying optical system according to the first embodiment. FIG. 5 depicts diagrams of astigmatism and distortion at the wide-angle edge of the reflex, magnifying optical system according to the first embodiment. FIG. 6 is a diagram of chromatic aberration of magnification at the wide-angle edge of the reflex, magnifying optical system according to the first embodiment. FIG. 7 is a diagram of spherical aberration at the intermediate edge of the reflex, magnifying optical system according to the first embodiment. FIG. 8 depicts diagrams of astigmatism and distortion at the intermediate edge of the reflex, magnifying optical system according to the first embodiment. FIG. 9 is a diagram of chromatic aberration of magnification at the intermediate edge of the reflex, magnifying optical system according to the first embodiment. FIG. 10 is a diagram of spherical aberration at the telephoto edge of the reflex, magnifying optical system according to the first embodiment. FIG. 11 depicts diagrams of astigmatism and distortion at the telephoto edge of the reflex, magnifying optical system according to the first embodiment. FIG. 12 is a diagram of chromatic aberration of magnification at the telephoto edge of the reflex, magnifying optical system according to the first embodiment. In the drawings, d, g, and C denote the aberration of a wavelength corresponding to d-rays ($\lambda$=587.56 nm), g-rays ($\lambda$=435.84 nm), and C-rays ($\lambda$=656.28 nm), respectively. Symbols S and M in the astigmatism diagram denote the aberration to a sagittal image surface and a meridional image surface, respectively.

Figure 13:
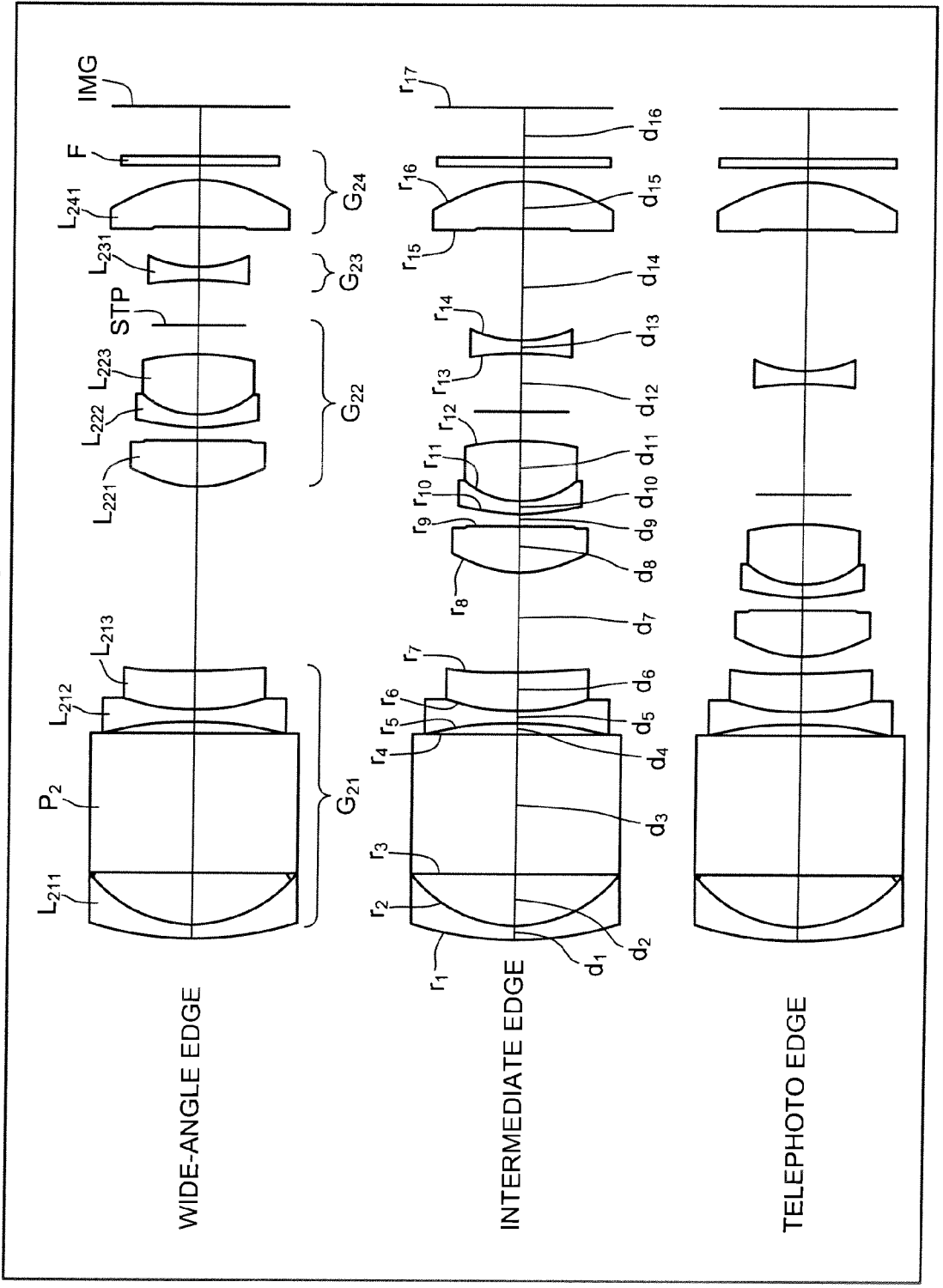
FIG. 13 is a cross sectional view, along the optical axis, of a reflex, magnifying optical system according to a second embodiment.

FIG. 13 is a cross sectional view, along the optical axis, of a reflex, magnifying optical system according to a second embodiment. The reflex, magnifying optical system includes sequentially from the object side (object not depicted) a first lens group $G_{21}$ having a negative refractive power, a second lens group $G_{22}$ having a positive refractive power, a third lens group $G_{23}$ having a negative refractive power, and a fourth lens group $G_{24}$ having a positive refractive power. The reflex, magnifying optical system varies magnification by moving the second lens group $G_{22}$ and the third lens group $G_{23}$ along the optical axis. The first lens group $G_{21}$ and the fourth lens group $G_{24}$ are fixed at all times. A filter F including an IR cut filter, a low-pass filter, a cover glass, etc. is arranged between the fourth lens group $G_{24}$ and an image plane IMG. The filter F is provided as necessary and may be omitted if not necessary. A light receiving surface of an imaging device such as a CCD and a CMOS is provided at the image plane IMG.

The first lens group $G_{21}$ includes sequentially from the object side, a first lens $L_{211}$ that has a negative refractive power and is a meniscus lens having a concave aspect facing toward the image, a prism $P_2$ that refracts the optical path, a second lens $L_{212}$ having a negative refractive power and a concave aspect facing toward the object, and a third lens $L_{213}$ having a positive refractive power. A portion of an aspect on the image plane IMG-side of the first lens $L_{211}$ abuts the plane of incidence of the prism $P_2$. The first lens $L_{211}$ is shaped so that a portion of the perimeter is omitted (see FIG. 2). A portion of an aspect on the object-side of the second lens $L_{212}$ abuts the plane of transmission of the prism $P_2$. The second lens $L_{212}$ and the third lens $L_{213}$ abut each other.

The second lens group $G_{22}$ includes sequentially from the object side, a first lens $L_{221}$ having a positive refractive power, a second lens $L_{222}$ having a negative refractive power, a third lens $L_{223}$ having a positive refractive power, and the optical diaphragm STP. An aspheric surface is formed on both faces of the first lens $L_{221}$. The second lens $L_{122}$ and the third lens $L_{123}$ are cemented together.

The third lens group $G_{23}$ includes a negative lens $L_{231}$ having two concave faces. An aspheric surface is formed on both faces of the negative lens $L_{231}$. It is preferable that the negative lens $L_{231}$ is formed of the resin.

The fourth lens group $G_{24}$ includes a positive lens $L_{241}$, having a convex aspect facing toward the image and whose refractive power becomes weaker progressively toward the perimeter of the lens. An aspheric surface is formed also on both faces of the positive lens $L_{241}$. It is preferable that the positive lens $L_{241}$ is formed of the resin.

Various numerical data of the reflex, magnifying optical system according to the second embodiment is given.
Total length=28.49
Focal length=4.23 (wide-angle edge) to 7.02 (intermediate edge) to 11.64 (telephoto edge)
F-number=2.68 (wide-angle edge) to 4.82 (telephoto edge)
Angle of view (2$\omega$)=73.2° (wide-angle edge) to 45.6° (intermediate edge) to 28.0° (telephoto edge)
Focal length of first lens group $G_{21}$=-5.59
Focal length of first lens $L_{211}$ in first lens group $G_{21}$=-8.62
Focal length of first lens $L_{212}$ in first lens group $G_{21}$=-6.91
Focal length of first lens $L_{213}$ in first lens group $G_{21}$=9.48
Focal length of second lens group $G_{22}$=6.62
Focal length of second lens $L_{221}$ in first lens group $G_{22}$=6.05
Focal length of second lens $L_{222}$ in first lens group $G_{22}$=-4.93
Focal length of second lens $L_{223}$ in first lens group $G_{22}$=4.35
Focal length of third lens group $G_{23}$=-5.48
Focal length of fourth lens group $G_{24}$=9.23
Image height=3
Magnification=2.73
(Numerical Values Related to Conditional Expression (1))
Image-side radius of curvature ($R_2$) of first lens $L_{211}$ abutting incident plane of prism $P_2$=4.48
Value ($yR_2$) of image-side aperture of first lens $L_{211}$ abutting incident plane of prism $P_2$+1.0 mm=4.19
Center distance ($\Delta H_2$) between prism $P_2$ and first lens $L_{211}$ abutting incident plane of prism $P_2$=1.75
(Numerical Values Related to Conditional Expression (2))
Image-side radius of curvature ($R_5$) of second lens $L_{212}$ abutting transmission plane of prism $P_2$=-13.2
Value ($yR_5$) of image-side effective aperture of second lens $L_{212}$ abutting transmission plane of prism $P_2$+1.0 mm=3.51
Center distance ($\Delta H_5$) between prism $P_2$ and second lens $L_{212}$ abutting light incidence plane of prism $P_2$=0.38
$r_1$=11.0
$d_1$=0.5 $nd_1$=1.9036 $vd_1$=31.3
$r_2$=4.48

Figure 14:
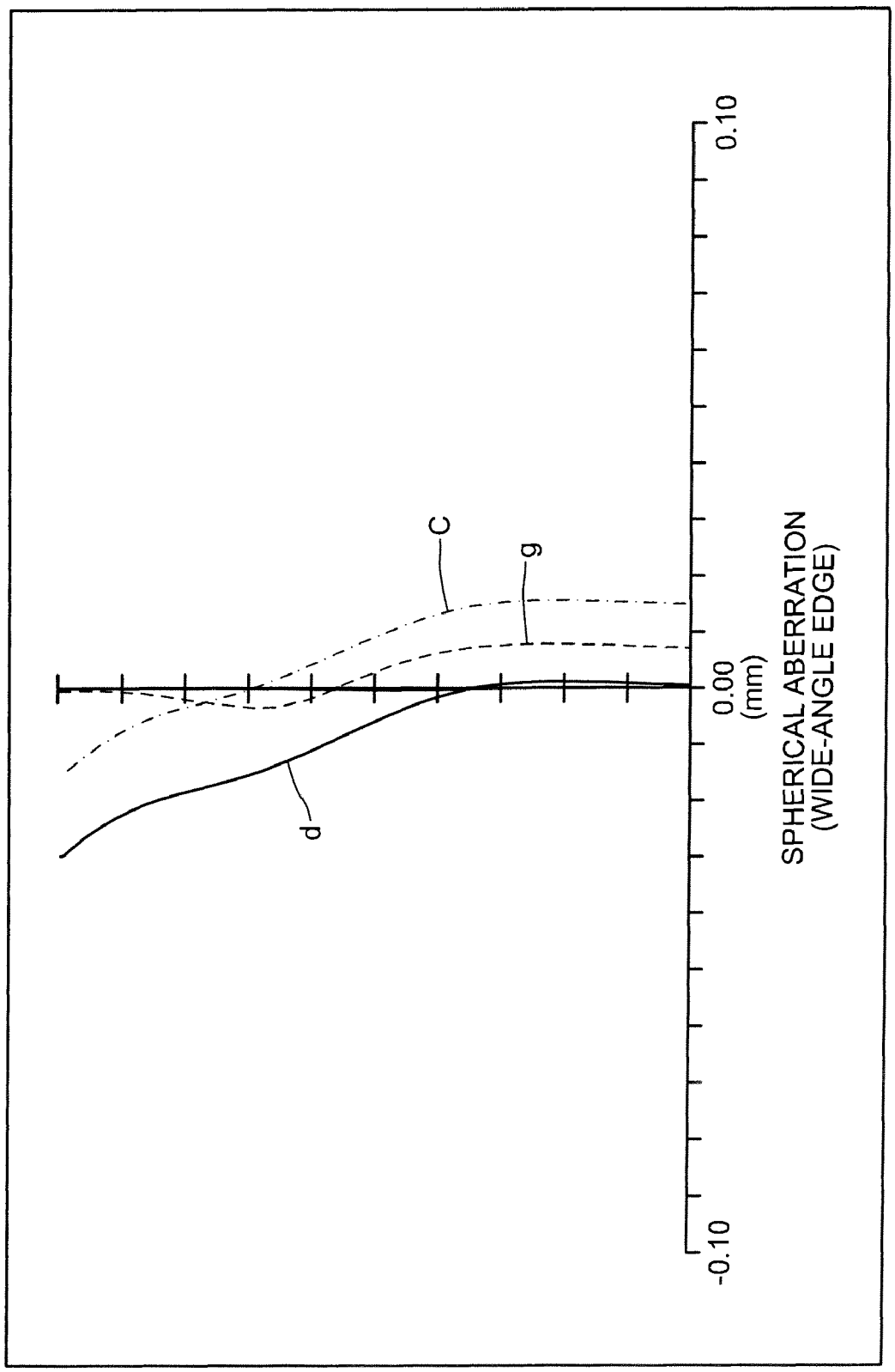
FIG. 14 is a diagram of spherical aberration at the wide-angle edge of the reflex, magnifying optical system according to the second embodiment.
Figure 15:
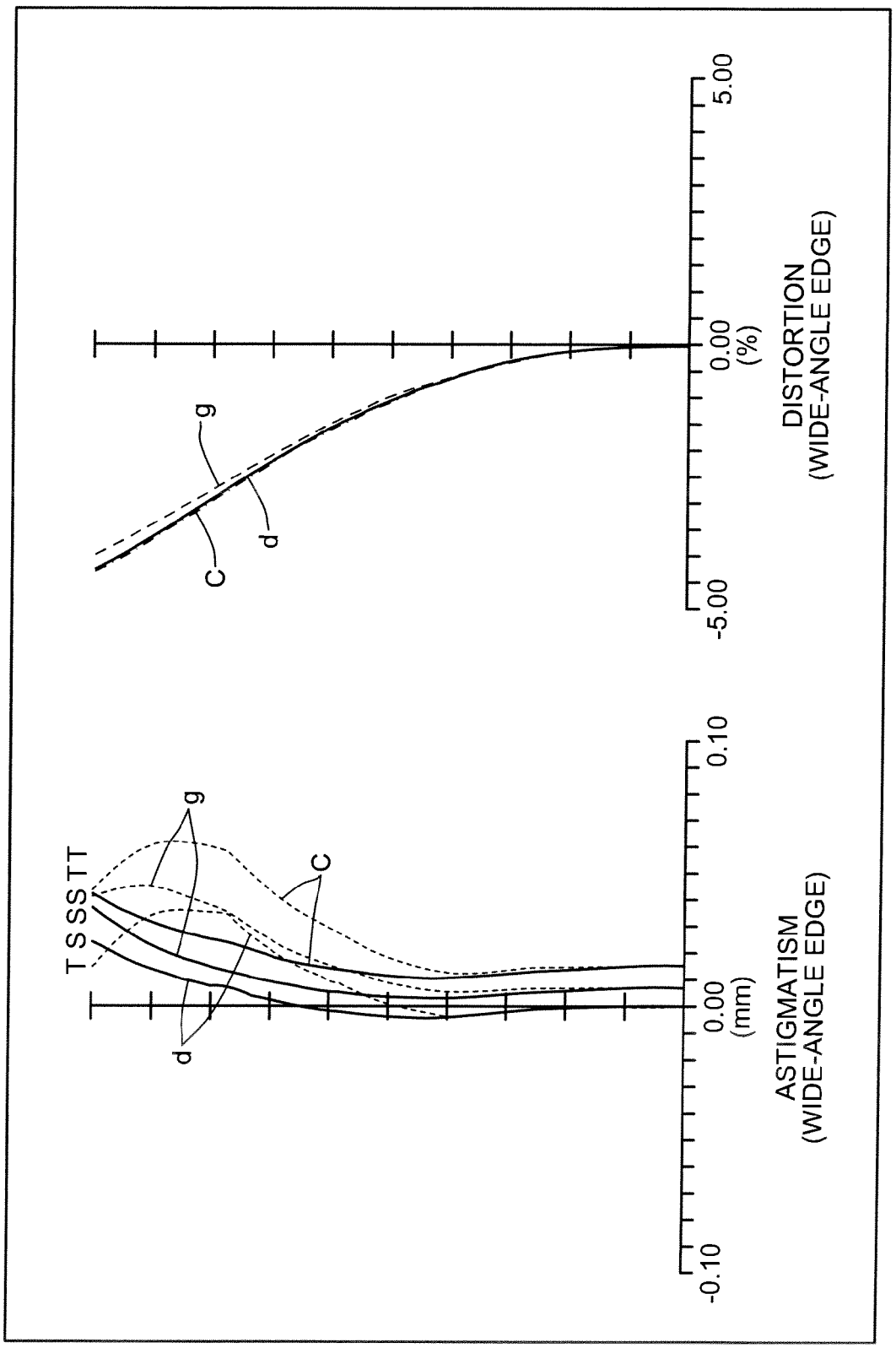
FIG. 15 depicts diagrams of astigmatism and distortion at the wide-angle edge of the reflex, magnifying optical system according to the second embodiment.
Figure 16:
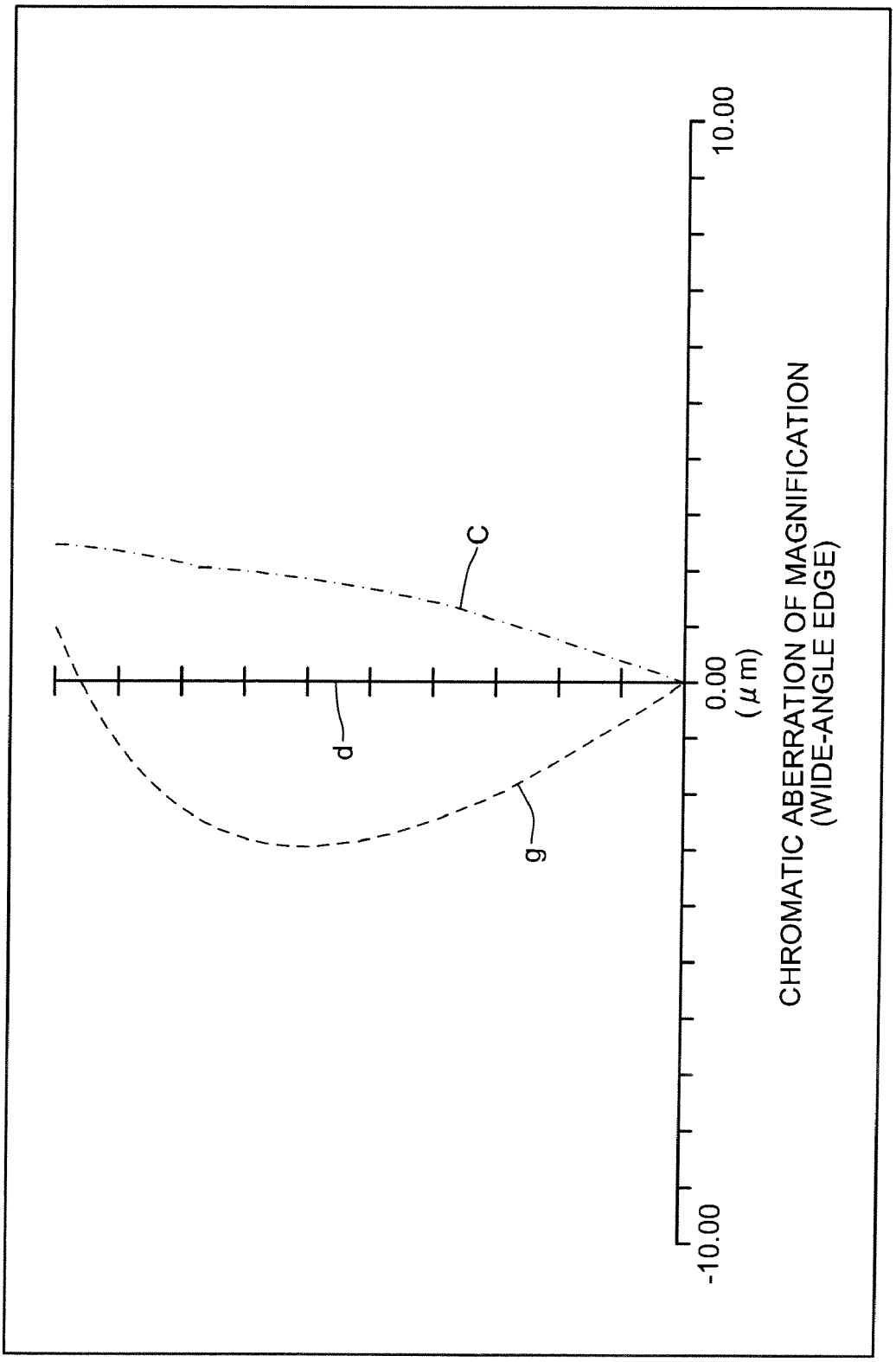
FIG. 16 is a diagram of chromatic aberration of magnification at the wide-angle edge of the reflex, magnifying optical system according to the second embodiment.
Figure 17:
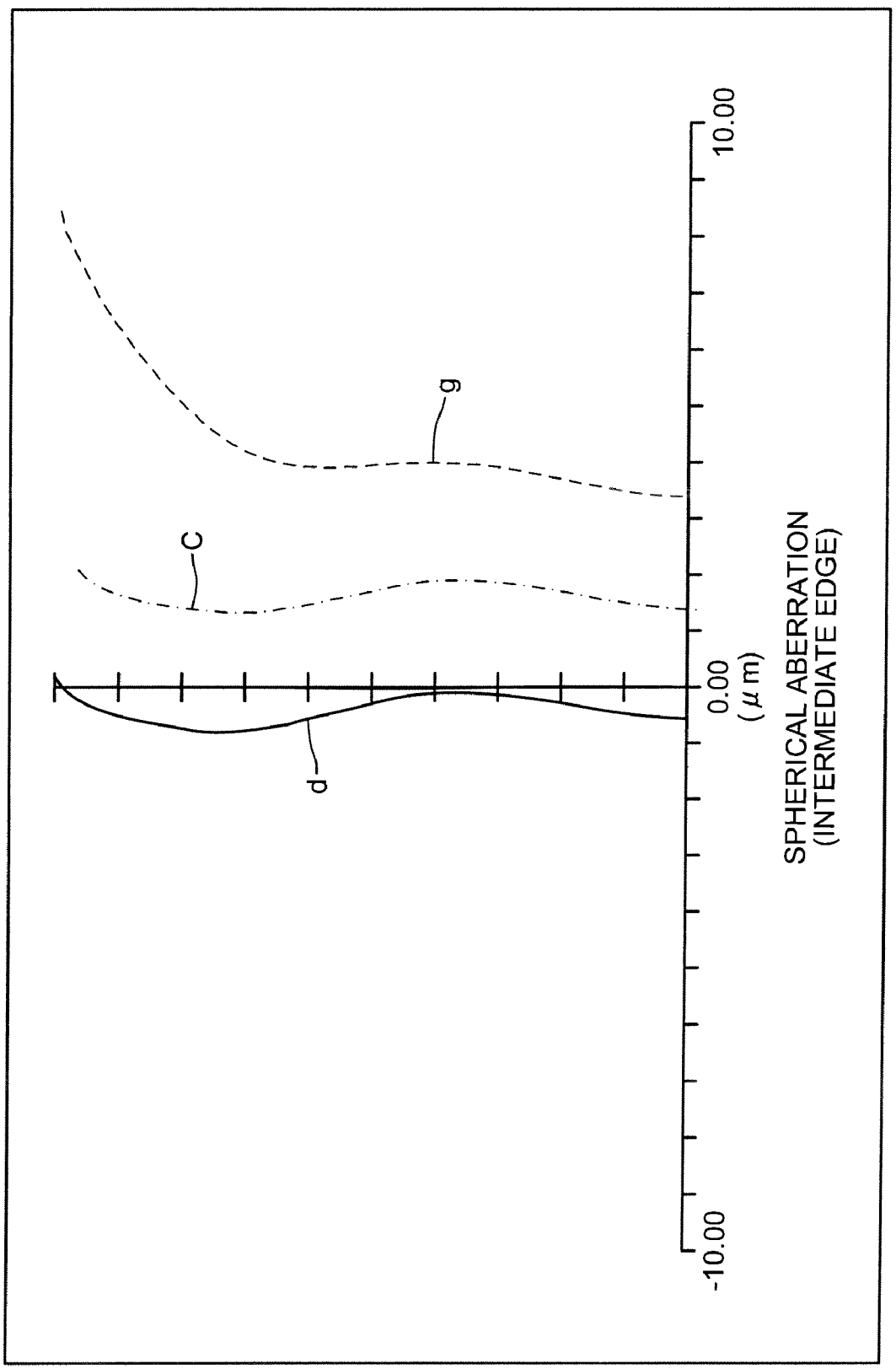
FIG. 17 is a diagram of spherical aberration at the intermediate edge of the reflex, magnifying optical system according to the second embodiment.
Figure 18:
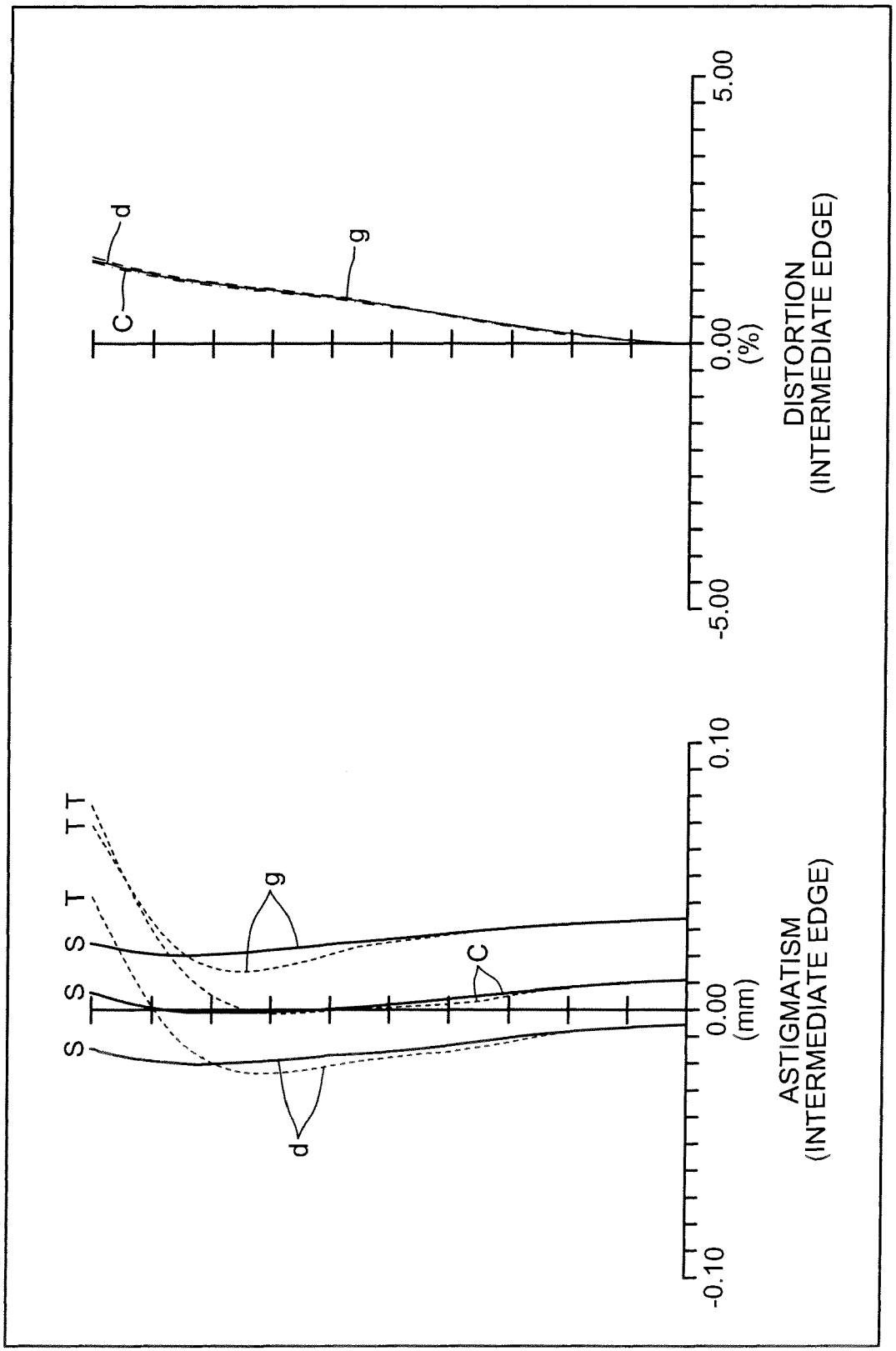
FIG. 18 depicts diagrams of astigmatism and distortion at the intermediate edge of the reflex, magnifying optical system according to the second embodiment.
Figure 19:
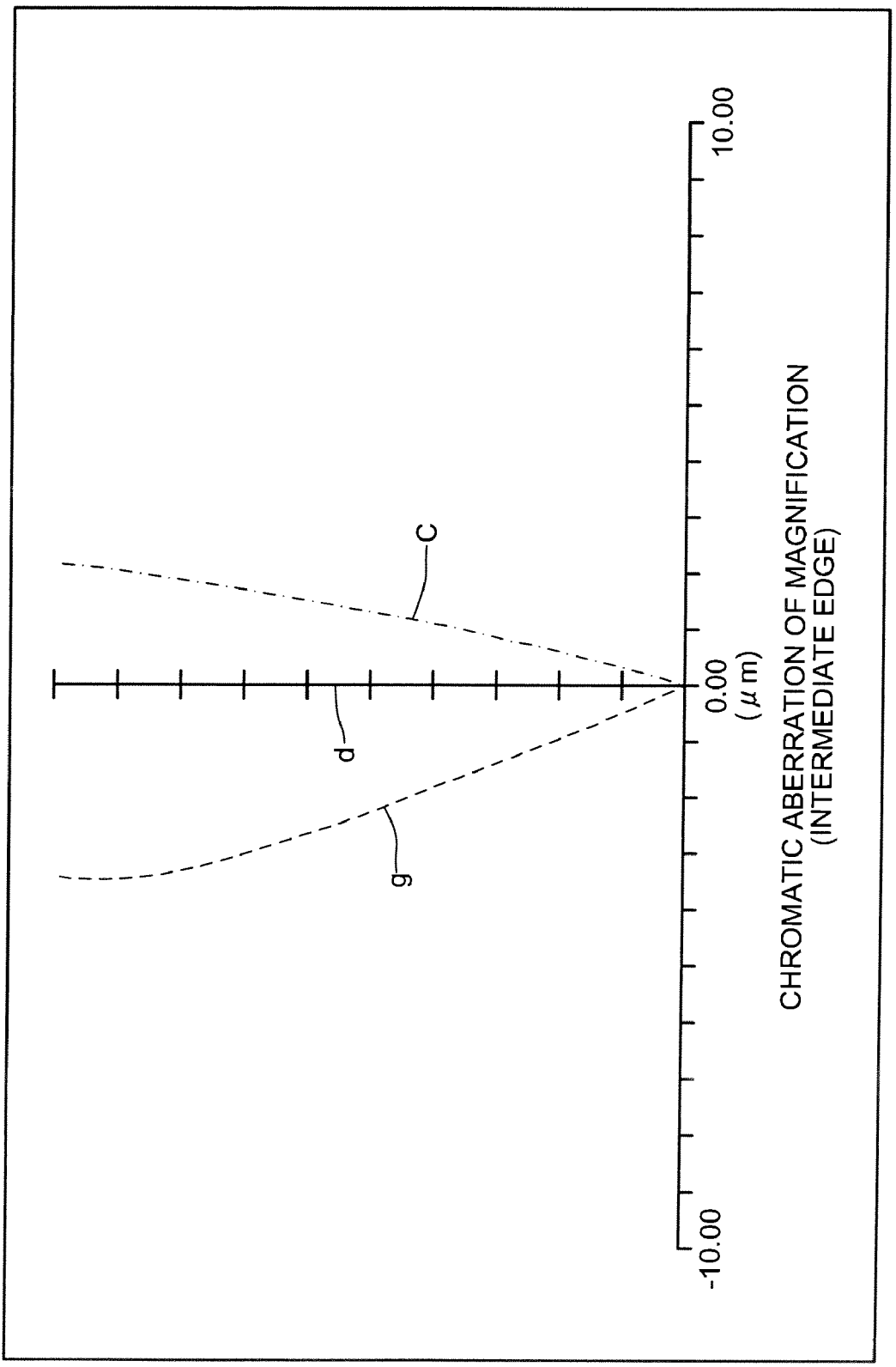
FIG. 19 is a diagram of chromatic aberration of magnification at the intermediate edge of the reflex, magnifying optical system according to the second embodiment.
Figure 20:
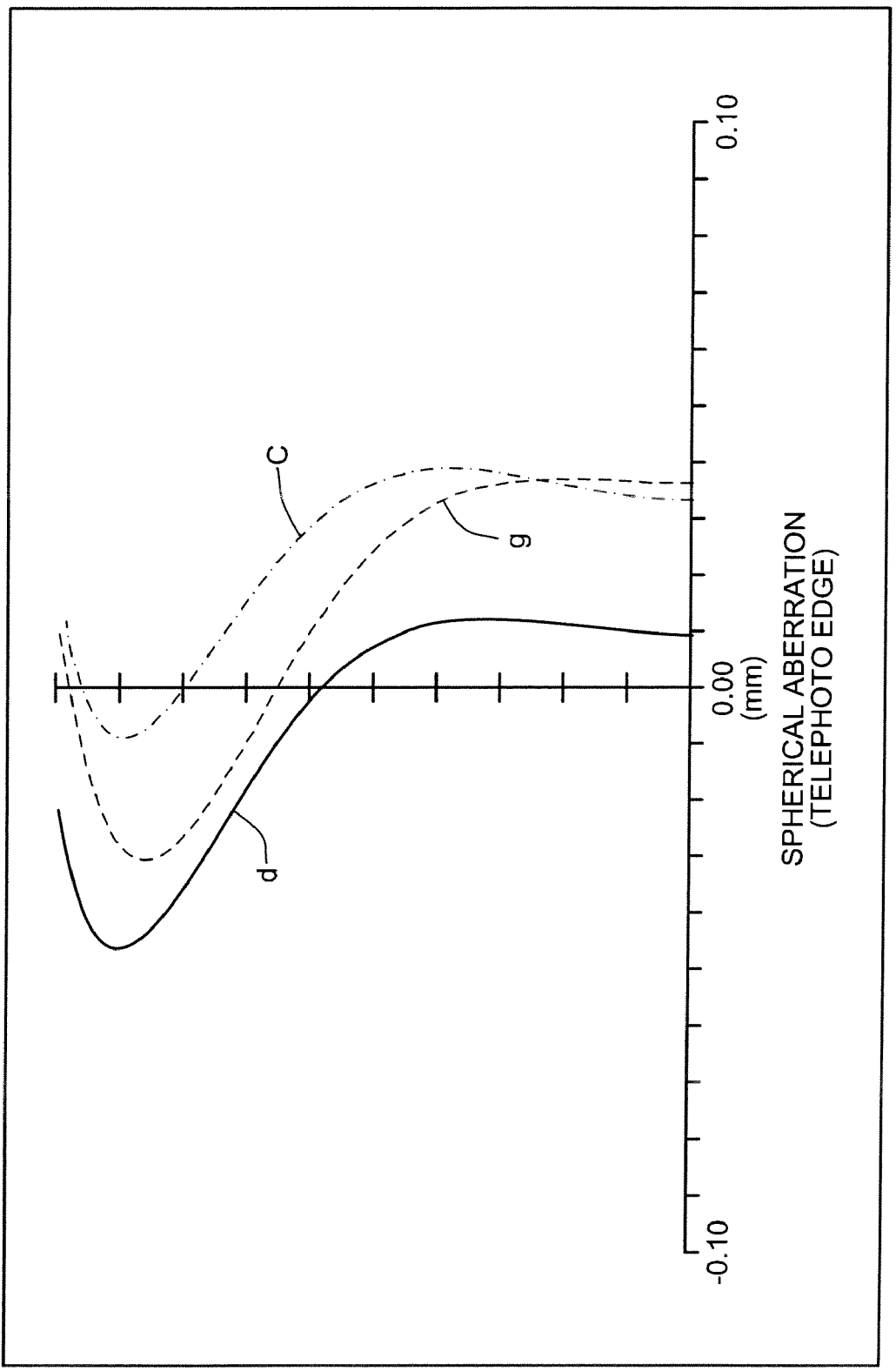
FIG. 20 is a diagram of spherical aberration at the telephoto edge of the reflex, magnifying optical system according to the second embodiment.
Figure 21:
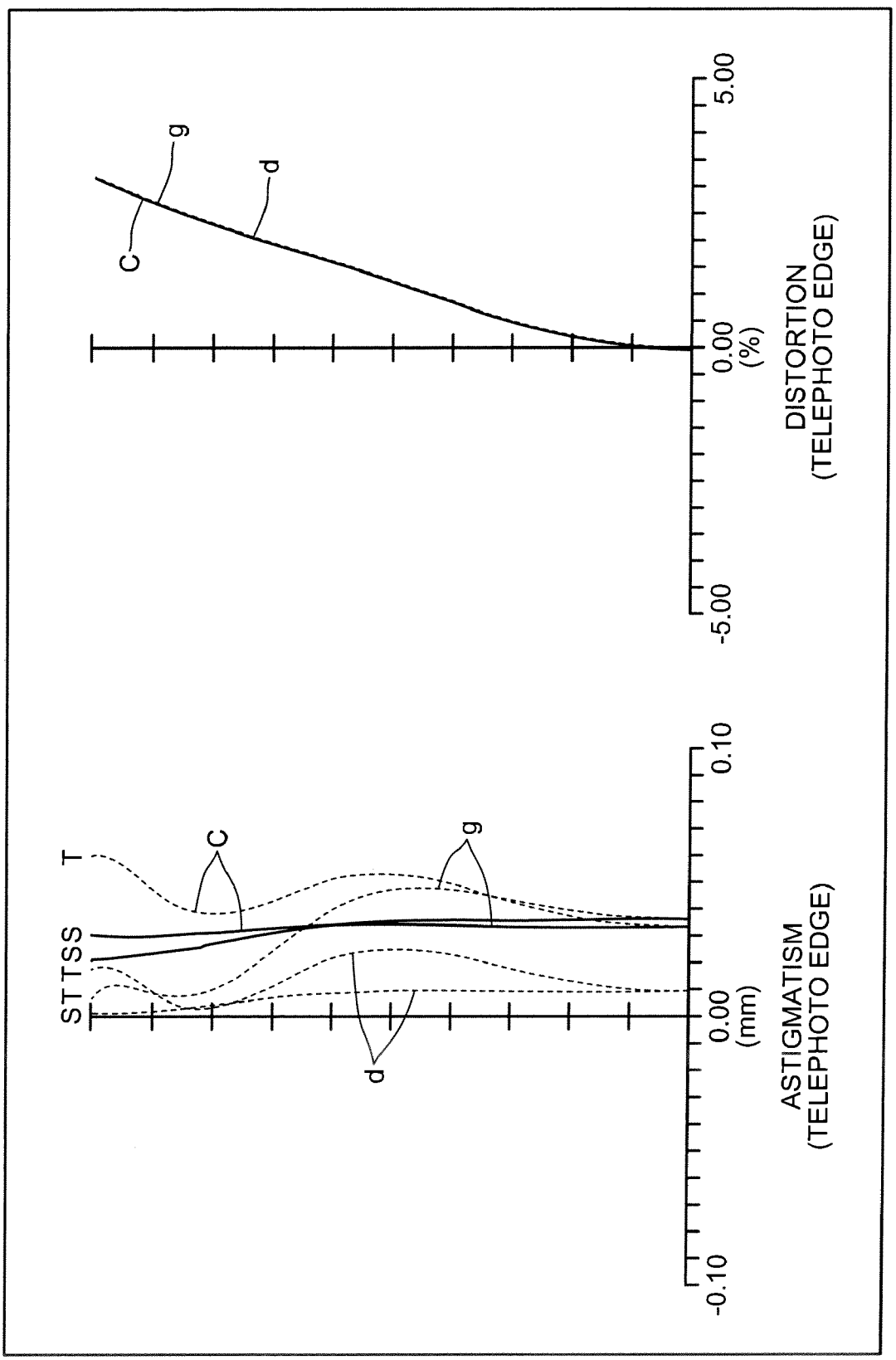
FIG. 21 depicts diagrams of astigmatism and distortion at the telephoto edge of the reflex, magnifying optical system according to the second embodiment.

$d_2$=1.75
$r_3$=∞ (prism plane)
$d_3$=4.8 $nd_2$=1.9036 $vd_2$=31.3
$r_4$∞ (prism plane)
$d_4$=0.383
$r_5$=−13.2
$d_5$=0.4 $nd_3$=1.6700 $vd_3$=47.2
$r_6$=7.28
$d_6$=1.35 $nd_4$=1.9229 $vd_4$=20.9
$r_7$=37.5
$d_7$=6.325716 (wide-angle edge) to 3.4174 (intermediate edge) to 0.5687 (telephoto edge)
$r_8$=4.0675 (aspheric surface)
$d_8$=1.6 $nd_5$=1.5891 $vd_5$=61.3
$r_9$=−25.543 (aspheric surface)
$d_9$=0.44
$r_{10}$=8.24
$d_{10}$=0.4 $nd_6$=1.9036 $vd_6$=31.3
$r_{11}$=2.84
$d_{11}$=2.11 $nd_7$=1.5168 $vd_7$=64.2
$r_{12}$=−8.16 (aspheric surface)
$d_{12}$=2.526259 (wide-angle edge) to 3.010011 (intermediate edge) to 4.82663 (telephoto edge)
$r_{13}$=−15.052 (aspheric surface)
$d_{13}$=0.4 $nd_8$=1.5312 $vd_8$=56.0
$r_{14}$=3.6637 (aspheric surface)
$d_{14}$=1.419317 (wide-angle edge) to 3.843989 (intermediate edge) to 4.87607 (telephoto edge)
$r_{15}$=−31.729 (aspheric surface)
$d_{15}$=1.6 $nd_9$=1.5312 $vd_9$=56.0
$r_{16}$=−4.337 (aspheric surface)
$d_{16}$=2.38
$r_{17}$=∞ (image plane)
Conic factor ($\epsilon$) and aspheric factor (A, B, C, D)
(Eighth Plane)
$\epsilon$=1.000,
A=−1.39×10$^{-3}$, B=7.60×10$^{-5}$,
C=−2.15×10$^{-5}$, D=1.11×10$^{-6}$
(Ninth Plane)
$\epsilon$=1.000,
A=1.19×10$^{-3}$, B=1.19×10$^{-4}$,
C=−2.96×10$^{-5}$, D=2.06×10$^{-6}$
(Thirteenth Plane)
$\epsilon$=1.000,
A=−1.18×10$^{-2}$, B=4.70×10$^{-3}$,
C=−1.72×10$^{-3}$, D=2.56×10$^{-4}$
(Fourteenth Plane)
$\epsilon$=1.000,
A=−1.09×10$^{-2}$, B=4.91×10$^{-3}$,
C=−1.65×10$^{-3}$, D=2.17×10$^{-4}$
(Fifteenth Plane)
$\epsilon$=1.000,
A=3.38×10$^{-4}$, B=−1.51×10$^{-4}$,
C=2.97×10$^{-5}$, D=−6.33×10$^{-7}$
(Sixteenth Plane)
$\epsilon$=1.000,
A=3.24×10$^{-3}$, B=−2.70×10$^{-4}$,
C=2.19×10$^{-5}$, D=5.09×10$^{-7}$ FIG. 14 is a diagram of spherical aberration at the wide-angle edge of the reflex, magnifying optical system according to the second embodiment. FIG. 15 depicts diagrams of astigmatism and distortion at the wide-angle edge of the reflex, magnifying optical system according to the second embodiment. FIG. 16 is a diagram of chromatic aberration of magnification at the wide-angle edge of the reflex, magnifying optical system according to the second embodiment. FIG. 17 is a diagram of spherical aberration at the intermediate edge of the reflex, magnifying optical system according to the second embodiment. FIG. 18 depicts diagrams of astigmatism and distortion at the intermediate edge of the reflex, magnifying optical system according to the second embodiment. FIG. 19 is a diagram of chromatic aberration of magnification at the intermediate edge of the reflex, magnifying optical system according to the second embodiment. FIG. 20 is a diagram of spherical aberration at the telephoto edge of the reflex, magnifying optical system according to the second embodiment. FIG. 21 depicts diagrams of astigmatism and distortion at the telephoto edge of the reflex, magnifying optical system according to the second embodiment. FIG. 22 is a diagram of chromatic aberration of magnification at the telephoto edge of the reflex, magnifying optical system according to the second embodiment. In the drawings, d, g, and C denote the aberration of a wavelength corresponding to d-rays ($\lambda$=587.56 nm), g-rays ($\lambda$=435.84 nm), and C-rays ($\lambda$=656.28 nm), respectively. Symbols S and M in the astigmatism diagram denote the aberration to a sagittal image surface and a meridional image surface, respectively.

In the numerical data above, $r_1$, $r_2$, ... denote the radius of curvature of respective lenses; $d_1$, $d_2$, ... denote the thickness or surface separation of respective lenses; $nd_1$, $nd_2$, ... denote the index of refraction of the d-rays in respective lenses; and $yd_1$, $yd_2$, ... denote Abbe number of the d-rays in respective lenses.

Each of the aspheric shapes above is expressed by equation 1, where the X axis represents the optical axis, the Y axis represents the direction perpendicular to the optical axis, and the direction of travel of the light is assumed as positive:

$$X = \frac{Y^2/R}{1+\sqrt{1-\varepsilon Y^2/R^2}} + AY^4 + BY^6 + CY^8 + DY^{10} \qquad 1$$

where, R is a paraxial radius of curvature, $\epsilon$ is the conic factor, and A, B, C, and D are aspheric factors of fourth order, sixth order, eighth order, and tenth order, respectively.

The reflex, magnifying optical system according to the present invention having the configuration described above is a compact, reflex, magnifying optical system designed to reduce error sensitivity and prevent deterioration of optical performance.

The reflex, magnifying optical system according to the present invention, having a configuration in which two lens respectively abut the plane of incidence and the plane of transmission of the optical element that refracts the optical path, can enhance reduction of the size of the optical system in terms of depth, suppresses optical dislocation (tilt) of the lenses, and prevents deterioration of optical performance.

The reflex, magnifying optical system according to the present invention, by omitting a portion of the perimeter of the lens abutting the optical element, can reduce a dimension of the lens in a vertical direction (perpendicular to optical axis) and prevents a problem of the light unrelated to focusing entering the optical system, causing ghost and flare phenomena.

By arranging the cemented lenses on the light emission side of the optical element, the occurrence of chromatic aberration can be suppressed. Use of the cemented lenses, as compared with an arrangement of individual lenses, enables centering to be omitted in the manufacturing process and therefore, simplification of the manufacturing process can be enhanced. In addition, manufacturing errors can be prevented and high optical performance can be maintained.

The reflex, magnifying optical system, by being configured appropriately using lenses with an aspheric surface formed thereon, can effectively correct various aberrations with a small number of lenses and can achieve reductions in size and weight of the optical system, and in manufacturing cost.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2008-060149 filed in Japan on Mar. 10, 2008.

What is claimed is:

1. A reflex, magnifying optical system that is a variable-magnification optical system having a plurality of lens groups and varying magnification by moving any of the lens groups, the reflex, magnifying optical system comprising:
   an optical element that is a prism refracting an optical path, an aspect of the prism on an object-side including straight edges symmetrical with respect to an optical axis;
   a first lens that includes planes parallel with the optical axis and symmetrical with respect to the optical axis, and includes a concave aspect facing the object-side of the optical element, a perimeter of the planes abutting the straight edges of the aspect of the optical element, and
   a second lens that includes a concave aspect facing an image side of the optical element with a radius of the second lens being smaller than a radius of the image side of the optical element and abuts the image side of the optical element.

2. The reflex, magnifying optical system according to claim 1, wherein
   the first lens has a negative refractive power and an aspheric surface on both sides,
   and
   the second lens includes two lenses abutting each other and has a negative refractive power.

3. The reflex, magnifying optical system according to claim 2, comprising four lens groups,
   wherein a first lens group consists of:
      the first lens;
      the optical element; and
      the second lens,
   a second lens group consists of three lenses and has a positive refractive power,
   a third lens group consists of a single lens and has a negative refractive power, and
   a fourth lens group consists of a single positive lens with a convex aspect facing toward an image.

4. The reflex, magnifying optical system according to claim 3, wherein at least two lenses of the second lens group are cemented together.

* * * * *